United States Patent
Kim et al.

(10) Patent No.: US 10,154,482 B2
(45) Date of Patent: Dec. 11, 2018

(54) METHOD FOR TRANSMITTING OR RECEIVING FRAME IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 15/520,822

(22) PCT Filed: May 13, 2016

(86) PCT No.: PCT/KR2016/005097
§ 371 (c)(1),
(2) Date: Apr. 20, 2017

(87) PCT Pub. No.: WO2016/182390
PCT Pub. Date: Nov. 17, 2016

(65) Prior Publication Data
US 2018/0063824 A1    Mar. 1, 2018

Related U.S. Application Data

(60) Provisional application No. 62/160,614, filed on May 13, 2015, provisional application No. 62/163,984, (Continued)

(51) Int. Cl.
*H04W 72/04* (2009.01)
*H04W 84/12* (2009.01)
*H04W 88/08* (2009.01)

(52) U.S. Cl.
CPC ......... *H04W 72/044* (2013.01); *H04W 72/04* (2013.01); *H04W 84/12* (2013.01); *H04W 88/08* (2013.01)

(58) Field of Classification Search
CPC ... H04W 72/044; H04W 72/04; H04W 84/12; H04W 88/08
See application file for complete search history.

(56) References Cited

U.S. PATENT DOCUMENTS

2015/0009894 A1* 1/2015 Vermani ............... H04L 1/0072
370/328
2015/0023337 A1* 1/2015 Gong ................ H04W 52/0238
370/338
(Continued)

FOREIGN PATENT DOCUMENTS

WO      2015064943         5/2015
WO    WO 2015/064943   *  5/2015  ............ H04W 76/06

OTHER PUBLICATIONS

Asterjadhi, A. et al. "LB 200 Comment Resolution for TXOP Sharing," IEEE P802.11 Wireless LANs, May 2014.*
(Continued)

*Primary Examiner* — Jae Y Lee
(74) *Attorney, Agent, or Firm* — Lee, Hong, Degerman, Kang & Waimey

(57) ABSTRACT

According to an embodiment of the present invention, a method for transmitting a frame by a station (STA) in a wireless LAN system supporting a high efficiency physical layer protocol data unit (HE PPDU) comprises the steps of: configuring a first duration field included in an HE-SIG A field; and transmitting a frame including the HE-SIG A field and an MAC header, wherein the first duration field may be configured to indicate a transmission opportunity (TXOP) value using a number of bits smaller than that of a second duration field included in the MAC header, and a granularity (Continued)

of a time unit used in the first duration field in order to indicate the TXOP value may be configured to be different from a granularity of a time unit used in the second duration field.

15 Claims, 24 Drawing Sheets

Related U.S. Application Data filed on May 20, 2015, provisional application No. 62/259,078, filed on Nov. 24, 2015, provisional application No. 62/276,246, filed on Jan. 8, 2016, provisional application No. 62/294,310, filed on Feb. 12, 2016, provisional application No. 62/297,938, filed on Feb. 21, 2016, provisional application No. 62/302,202, filed on Mar. 2, 2016, provisional application No. 62/304,304, filed on Mar. 6, 2016.

(56) References Cited

U.S. PATENT DOCUMENTS

| 2015/0055546 A1* | 2/2015 | Jafarian | H04W 28/02 370/315 |
| 2016/0150505 A1* | 5/2016 | Hedayat | H04L 69/22 370/329 |

OTHER PUBLICATIONS

PCT International Application No. PCT/KR2016/005097, Notification of Transmittal of the International Search Report and the Written Opinion of the International Searching Authority, or Declaration dated Aug. 11, 2016, 9 pages.

Asterjadhi, A. et al., "LB 200 Comment Resolution for TXOP Sharing", IEEE P802.11 Wireless LANs, May 2014, 9 pages.

* cited by examiner

FIG. 4
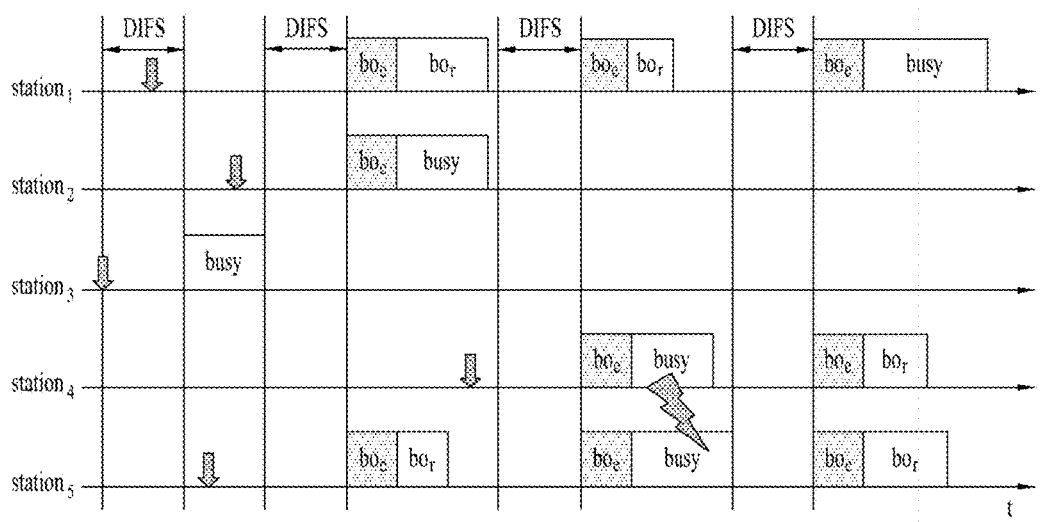

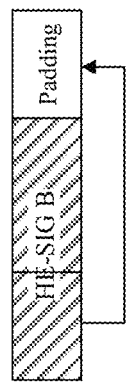
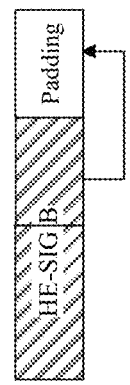
FIG. 18

METHOD FOR TRANSMITTING OR RECEIVING FRAME IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2016/005097, filed on May 13, 2016, which claims the benefit of U.S. Provisional Application Nos. 62/160,614, filed on May 13, 2015, 62/163,984, filed on May 20, 2015, 62/259,078, filed on Nov. 24, 2015, 62/276,246, filed on Jan. 8, 2016, 62/294,310, filed on Feb. 12, 2016, 62/297,938, filed on Feb. 21, 2016, 62/302,202, filed on Mar. 2, 2016, and 62/304,304, filed on Mar. 6, 2016, the contents of which are all hereby incorporated by reference herein in their entirety.

TECHNICAL FIELD

The present invention relates to a method of transmitting or receiving frames in a wireless LAN system and, more particularly, to a method of transmitting and receiving frames for management of a transmission opportunity (TXOP) or network allocation vector (NAV) and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

1 The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention devised to solve the problem lies in a method of efficiently signaling a TXOP duration by a TXOP holder/responder STA through frame transmission in a wireless LAN system supporting an HE PPDU and a method of accurately managing a NAV by a third party STA that receives signaling of the TXOP duration through a corresponding frame.

The present invention is not limited to the above technical problems and other technical objects may be inferred from embodiments of the present invention.

Technical Solution

In an aspect of the present invention, a method of transmitting a frame by a station (STA) in a wireless LAN system supporting an HE PPDU (high efficiency physical layer protocol data unit) includes: setting a first duration field included in an HE-SIG A field; and transmitting a frame including the HE-SIG A field and a MAC header, wherein in setting of the first duration field included in the HE-SIG A field, the first duration field is set to indicate a TXOP (transmission opportunity) value using a smaller number of bits than a second duration field included in the MAC header, and wherein a granularity of a time unit used for indicating the TXOP value in the first duration field is set to be different from a granularity of a time unit used in the second duration field.

In another aspect of the present invention, a station transmitting a frame in a wireless LAN system supporting an HE PPDU includes: a processor for setting a first duration field included in an HE-SIG A field; and a transmitter for transmitting a frame including the HE-SIG A field and a MAC header, wherein in setting of the first duration field included in the HE-SIG A field, the first duration field is set to indicate a TXOP value using a smaller number of bits than a second duration field included in the MAC header, and wherein a granularity of a time unit used for indicating the TXOP value in the first duration field is set to be different from a granularity of a time unit used in the second duration field.

In another aspect of the present invention, a method of managing a network allocation vector (NAV) by a station (STA) in a wireless LAN system supporting an HE PPDU includes: receiving a frame including an HE-SIG A field and a MAC header; and performing NAV management based on one of a first duration field included in the HE-SIG A field and a second duration field included in the MAC header, wherein the first duration field is set to indicate a TXOP value using a smaller number of bits than the second duration field included in the MAC header, and wherein a granularity of a time unit used for indicating the TXOP value in the first duration field is set to be different from a granularity of a time unit used in the second duration field.

The granularity of the time unit used in the first duration field may vary depending on the TXOP value to be indicated through the first duration field.

The first duration field may include at least one bit indicating the granularity determined according to the TXOP value. The remaining bits of the first duration field may indicate how many number of time units based on the indicated granularity are included in the TXOP value.

The first duration field may be set to 5, 6 or 7 bits and the most significant bit (MSB) of the first duration field may be used to indicate the granularity of a time unit. The first duration field may be set to 5 bits and the granularity indicated by the MSB may be one of 32 µs and 512 µs, the first duration field may be set to 6 bits and the granularity indicated by the MSB may be one of 16 µs and 256 µs, or the first duration field may be set to 7 bits and the granularity indicated by the MSB may be one of 8 µs and 128 µs.

Both the TXOP value indicated by the first duration field and a TXOP value indicated by the second duration field may be set for transmission of the same frame, and the TXOP value indicated by the first duration field may greater than or equals to the TXOP value indicated by the second duration field.

The STA performing NAV management may set, update or reset a time where channel access is restricted in order to protect a TXOP of a transmitter of the frame or a receiver of the frame when the STA is not designated as the receiver of the frame.

The STA performing NAV management may perform NAV management on the basis of the second duration field when the MAC header has been successfully decoded and perform NAV management on the basis of the first duration field when decoding of the MAC header has been failed.

Advantageous Effects

According to an embodiment of the present invention, a TXOP duration is set in an HE-SIG A field and thus even third party STAs that do not decode a MAC header can accurately protect a TXOP of a TXOP holder/responder. Furthermore, it is possible to minimize signaling overhead of the HE-SIG A field by using multiple granularities of time units for a TXOP duration field set in the HE-SIG A field.

Other technical effects in addition to the above-described effects may be inferred from embodiments of the present invention.

DESCRIPTION OF DRAWINGS

FIG. 4 illustrates a backoff procedure.

FIGS. 17 and 18 illustrating an HE-SIG B padding method.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
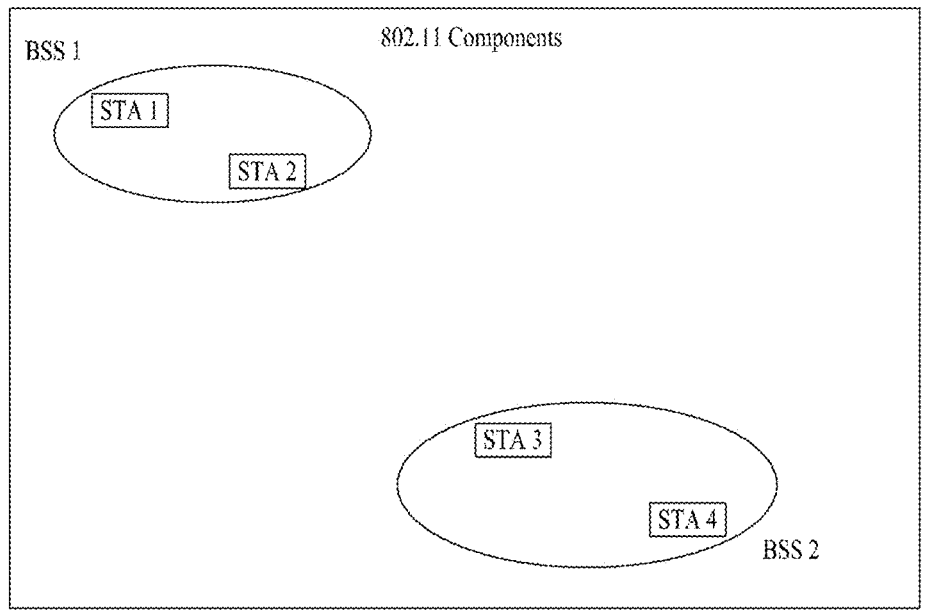
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
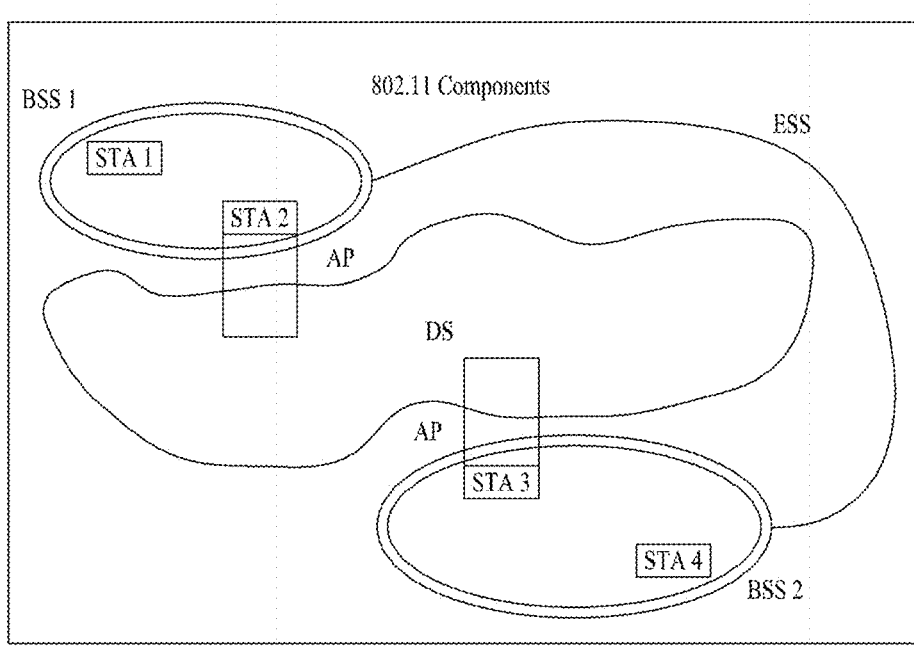
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and. setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An X-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MIME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
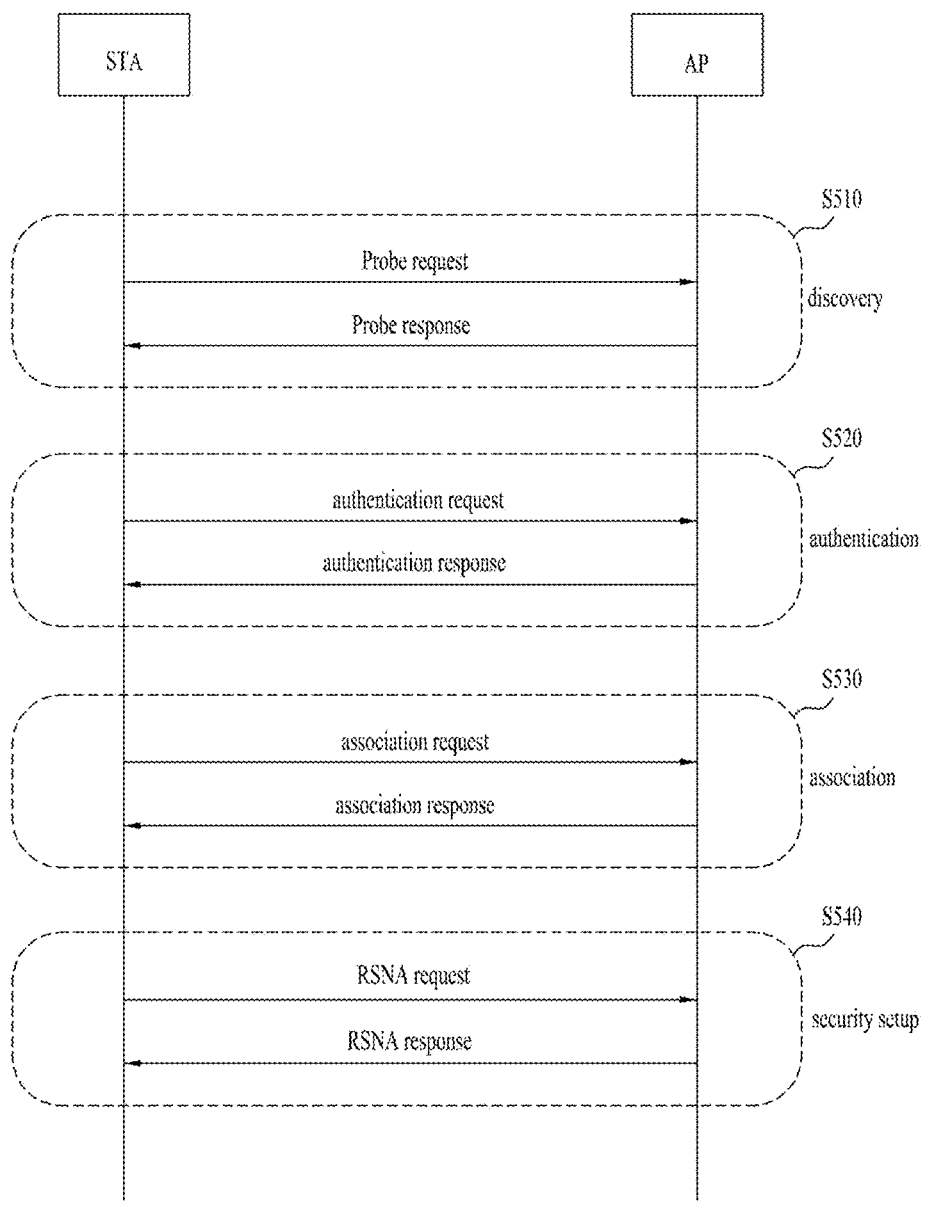
FIG. 3 illustrates a general link setup procedure.

FIG. 3 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

FIG. 4 is a conceptual diagram illustrating a backoff process.

Operations based on a random backoff period will hereinafter be described with reference to FIG. 4. If the occupy-or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin Preferably, CW, CWmin, and CWmax are set to $2^n-1$ (where n=0, 1, 2, . . . ).

If the random backoff process starts operation, the STA continuously mon'tors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time.

During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
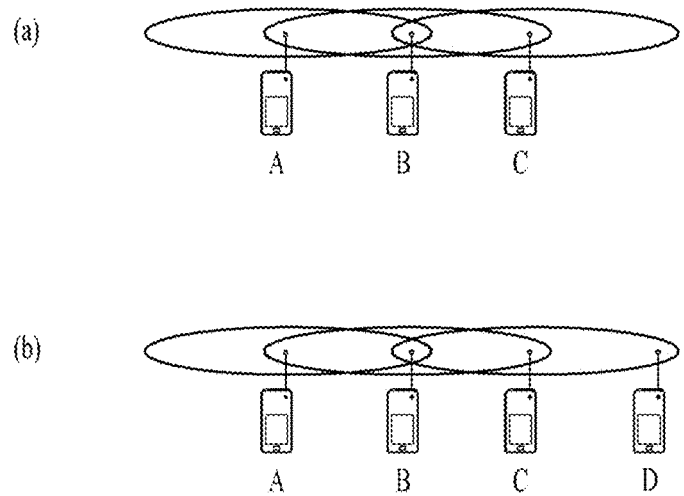
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
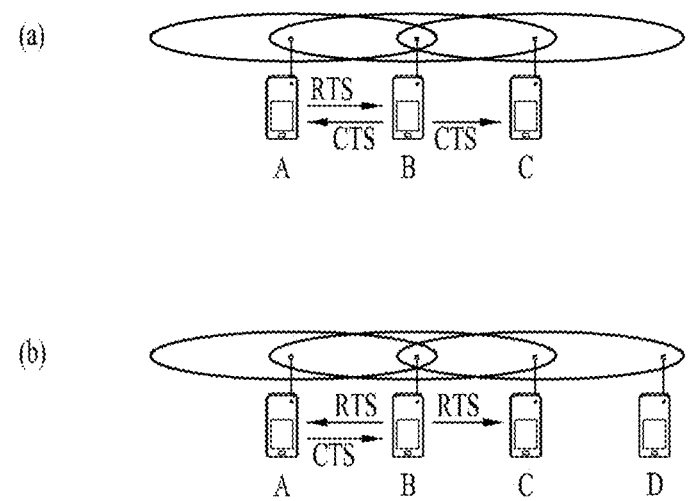
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unitcast frame and a delivery traffic indication map (DTIM) used to indicate a multicast or broadcast frame.

Figure 7:
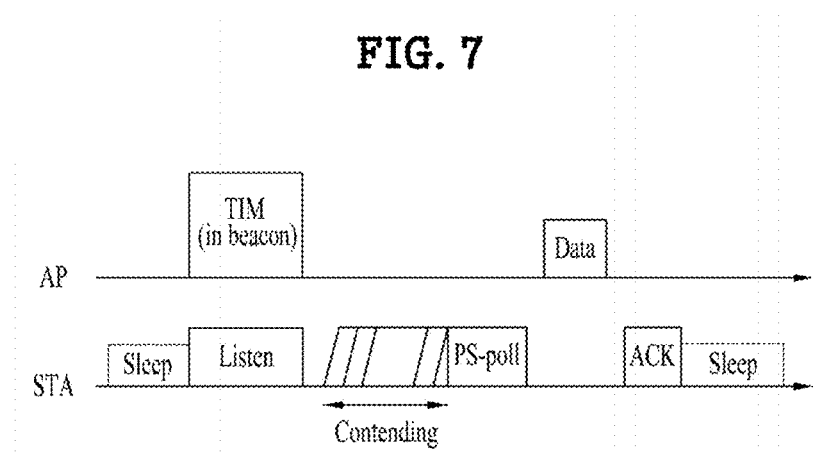
FIGS. 7 to 9 are explanatory diagrams of operation of an STA that has received TIM.
Figure 8:
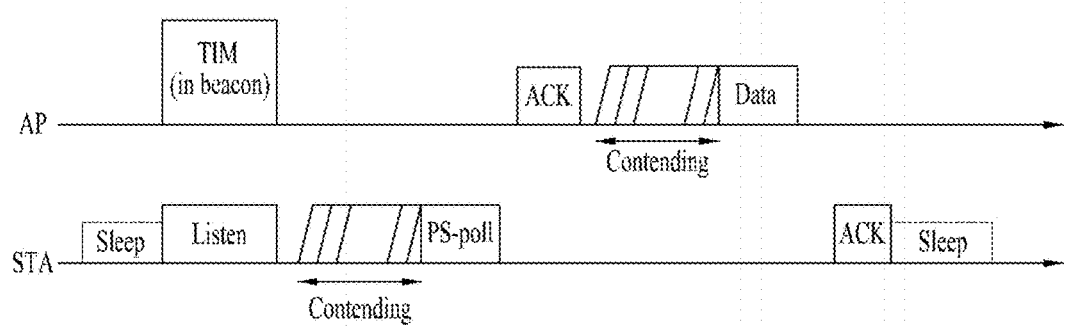
Figure 9:
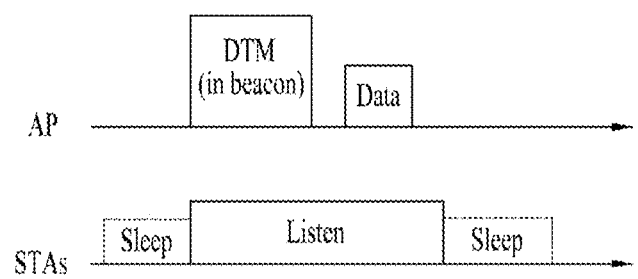

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
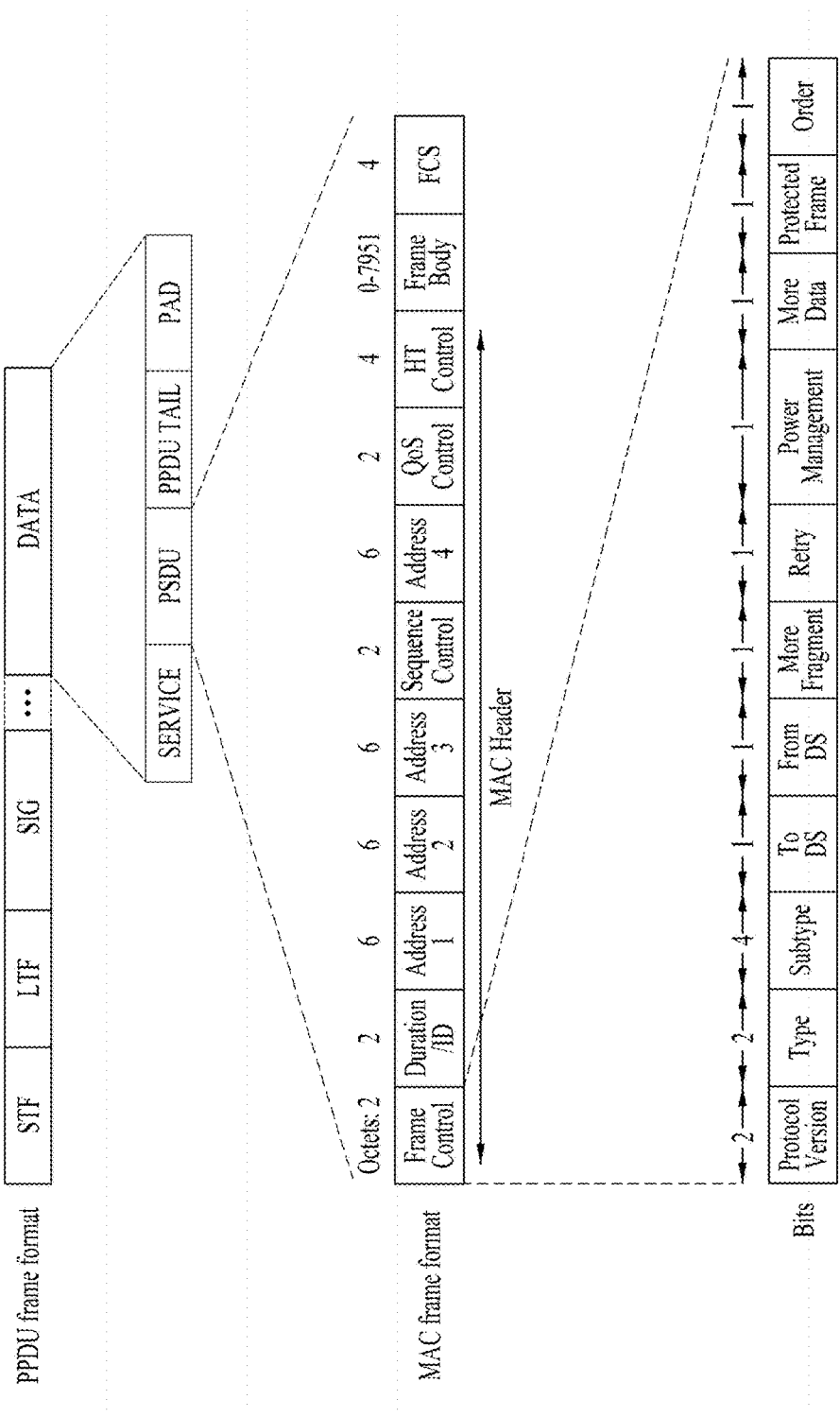
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
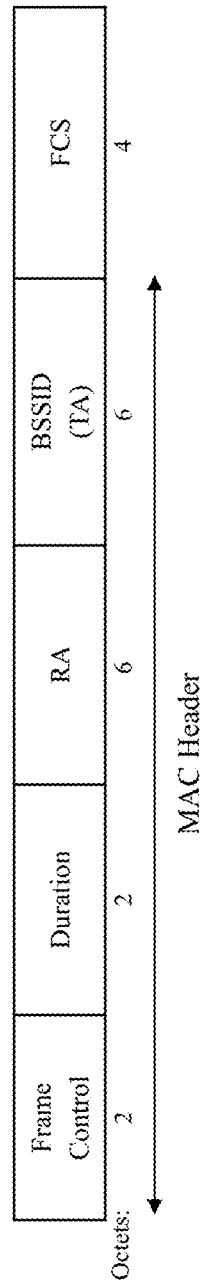
FIG. 11 illustrates a contention free (CF)-END frame.

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

EXAMPLE of HE PPDU Structure

A description will be given of examples of an HE PPDU (High Efficiency Physical layer Protocol Data Unit) format in a wireless LAN system supporting 11ax.

Figure 12:
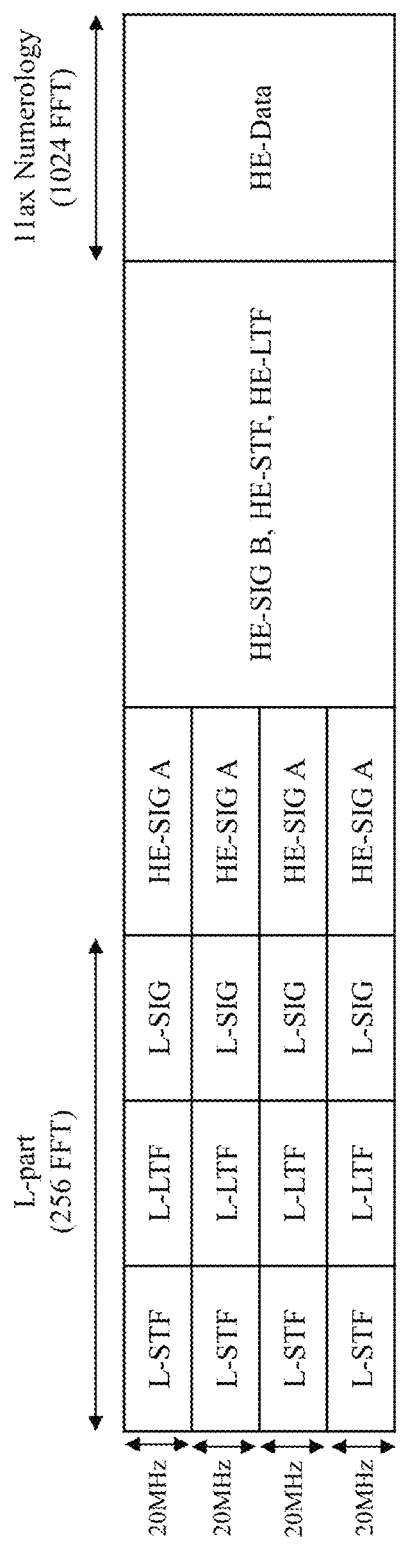
FIG. 12 illustrates an example of an HE PPDU.

FIG. 12 illustrates an example of the HE PPDU. Referring to FIG. 12, an HE-SIG A (or HE-SIG1) field follows an L-Part (e.g., L-STF, L-LTF, L-SIG) and is duplicated every 20 MHz like the L-Part. The HE-SIG A field includes common control information (e.g., BW, GI length, BSS index, CRC, Tail, etc.) for STAs. The HE-SIG A field includes information for decoding the HE PPDU and thus information included in the HE-SIG A field may depend on the format of the HE PPDU (e.g., SU PPDU, MU PPDU, trigger-based PPDU or the like). For example, in the HE SU PPDU format, the HE-SIG A field may include at least one of a DL/UL indicator, HE PPDU format indicator, BSS color, TXOP duration, BW (bandwidth), MCS, CP+LTF length, coding information, the number of streams, STBC (e.g., whether STBC is used), transmission beamforming (TxBF) information, CRC and Tail. In the case of the HE SU PPDU format, the HE-SIG B field may be omitted. In the HE MU PPDU format, the HE-SIG A field may include at least one of a DL/UL indicator, BSS color, TXOP duration, BW, MCS information of a SIG B field, the number of symbols of the SIG B field, the number of HE LTF symbols, indicator indicating whether full band MU-MIMO is used, CP+LTF length, transmission beamforming (TxBF) information, CRC and Tail. In the HE trigger-based PPDU format, an HE-SIG A field may include at least one of a format indicator (e.g., indicating the SU PPDU or trigger-based PPDU), BSS color, TXOP duration, BW, CRC and Tail.

Figure 13:
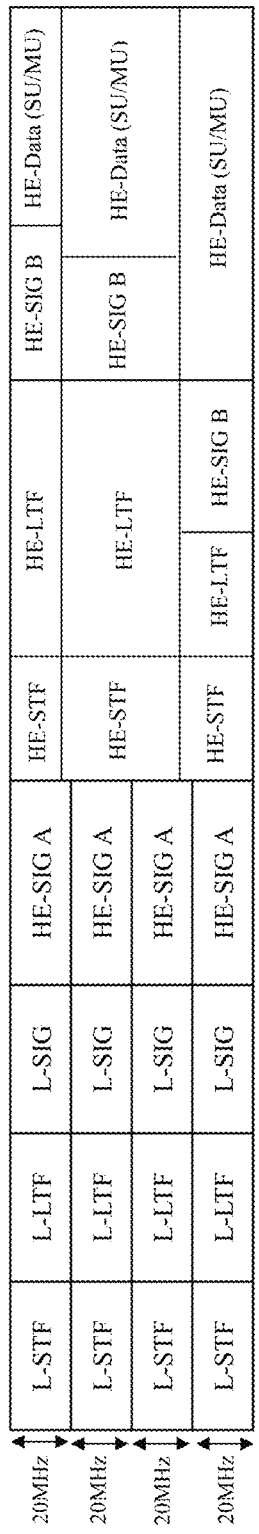
FIG. 13 illustrates another example of the HE PPDU.

FIG. 13 illustrates another example of the HE PPDU. Referring to FIG. 13, the HE-SIG A may include user allocation information, for example, at least one of an STA ID such as a PAID or a GID, allocated resource information and the number of streams (Nsts), in addition to the common control information. Referring to FIG. 13, the HE-SIG B (or HE-SIG2) may be transmitted for each OFDMA allocation. In the case of MU-MIMO, the HE-SIG B is identified by an STA through SDM. The HE-SIG B may include additional user allocation information, for example, an MCS, coding information, STBC (Space Time Block Code) information and transmission beamforming (TXBF) information.

Figure 14:
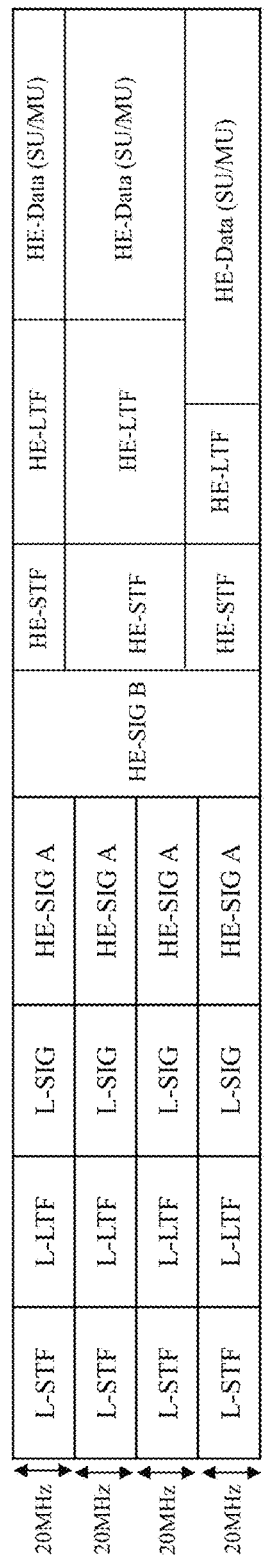
FIG. 14 illustrates another example of the HE PPDU.

FIG. 14 illustrates another example of the HE PPDU. The HE-SIG B is transmitted following the HE-SIG A. The HE-SIG B may be transmitted through the full band on the basis of numerology of the HE-SIG A. The HE-SIG B may include user allocation information, for example, STA AID, resource allocation information (e.g., allocation size), MCS, the number of streams (Nsts), coding, STBC and transmission beamforming (TXBF) information.

Figure 15:
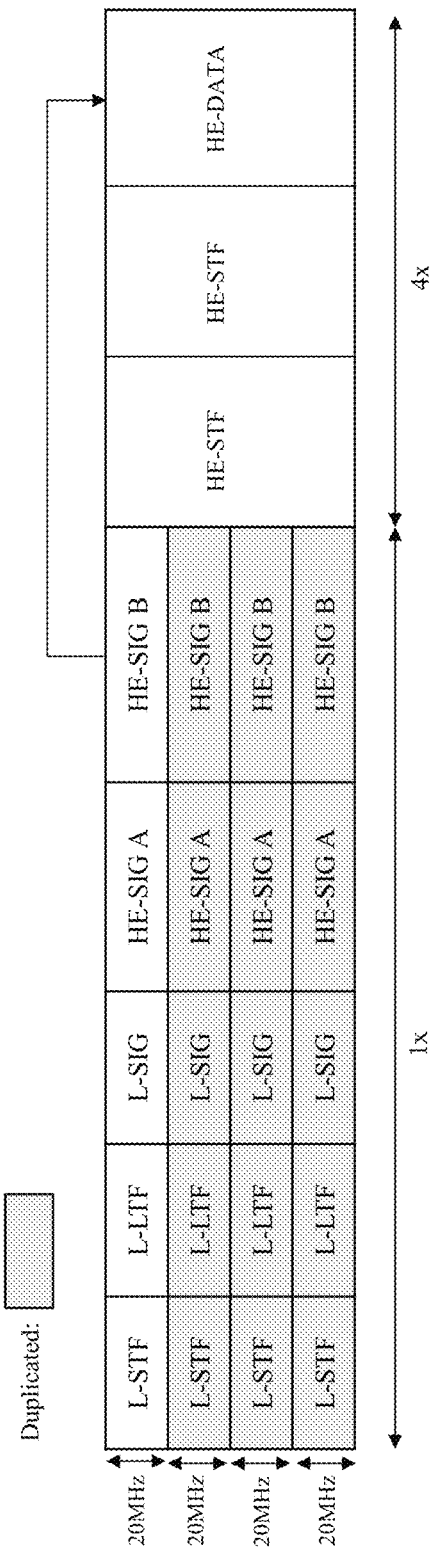
FIG. 15 illustrates another example of the HE PPDU.

FIG. 15 illustrates another example of the HE PPDU. The HE-SIG B may be duplicated per predetermined unit channel Referring to FIG. 15, the HE-SIG B may be duplicated per 20 MHz. For example, the HE-SIG B can be transmitted in such a manner that the same information is duplicated per 20 MHz in 80 MHz bandwidth.

An STA/AP which has received the HE-SIG B duplicated every 20 MHz may accumulate the received HE-SIG B per 20 MHz channel to improve reliability of HE-SIG B reception.

Since the same signal (e.g., HE-SIG B) is duplicated and transmitted per channel, the gain of accumulated signals is proportional to the number of channels over which the signal is duplicated and transmitted to improve reception performance. In theory, a duplicated and transmitted signal can have a gain corresponding to 3 dB×(the number of channels) compared to the signal before duplication. Accordingly, the duplicated and transmitted HE-SIG B may be transmitted with an increased MCS level depending on the number of channels through which the HE-SIG B is duplicated and transmitted. For example, if MCS0 is used for the HE-SIG B transmitted without being duplicated, MCS1 can be used for the HE-SIG B duplicated and transmitted. Since the HE-SIG B can be transmitted with a higher MCS level as the number of channels for duplication increases, HE-SIG B overhead per unit channel can be reduced.

Figure 16:
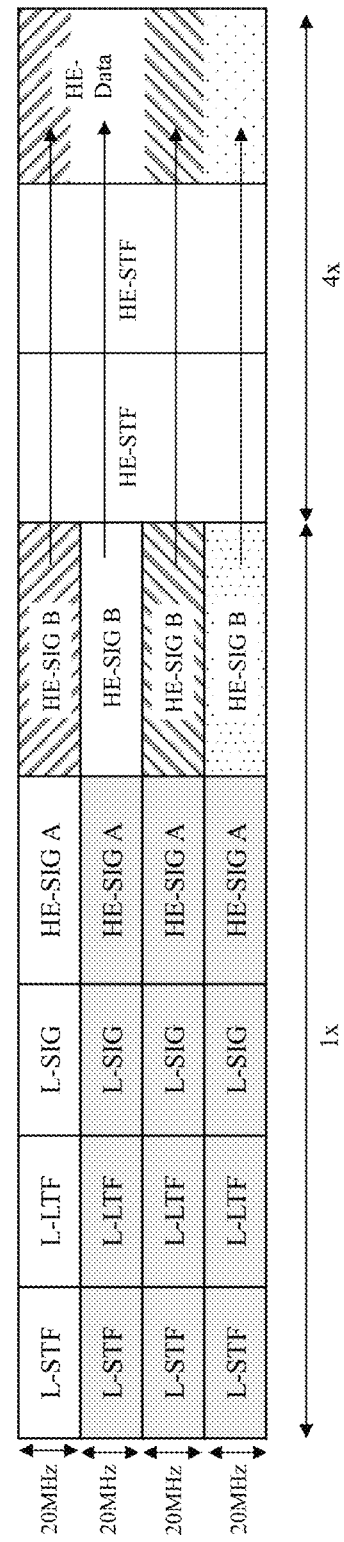
FIG. 16 illustrates another example of the HE PPDU.

FIG. 16 illustrates another example of the HE PPDU. Referring to FIG. 16, the HE-SIG B may include independent information per 20 MHz channel The HE-SIG B may be transmitted in a 1x symbol structure like the Legacy part (e.g., L-STF, L-LTF, L-SIG) and HE-SIG A. Meanwhile, a length of "L-STF+L-LTF+L-SIG+HE-SIGA+HE-SIGB" needs to be identical in all channels in a wide bandwidth.

The HE-SIG B transmitted per 20 MHz channel may include allocation information about the corresponding band, for example, allocation information per user using the corresponding band, user ID, etc. However, the information of the HE-SIG B may vary between bands because the respective bands support different numbers of users and use different resource block configurations. Accordingly, the length of the HE-SIG B may be different for respective channels.

Figure 17:
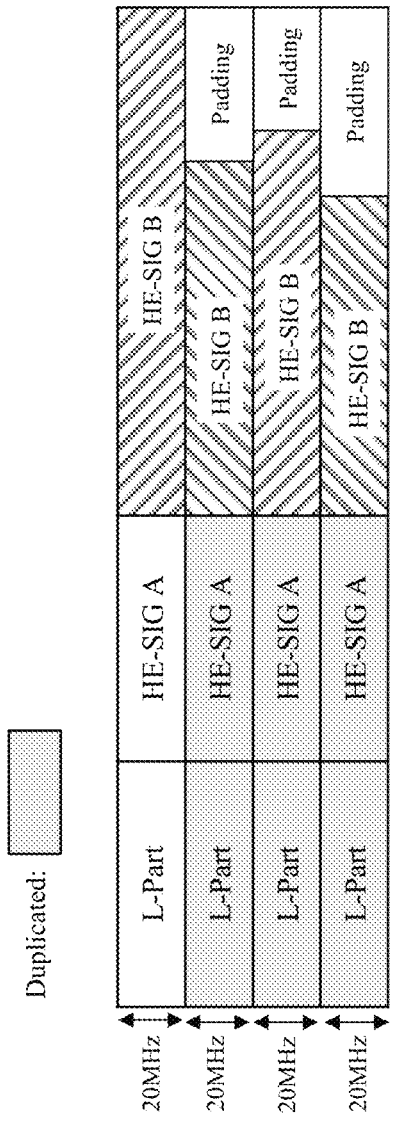

FIG. 17 illustrates an HE-SIG B padding method by which lengths before HE-STF (e.g., lengths to the HE-SIG B) become identical for respective channels. For example, the HE-SIG B may be duplicated by a padding length to align HE-SIG B lengths. As illustrated in FIG. 18, the HE-SIG B corresponding to a necessary padding length may be padded to the HE-SIG B from the start (or end) of the HE-SIG B.

According to an example, one HE-SIG B field can be transmitted when the bandwidth does not exceed 20 MHz. When the bandwidth exceeds 20 MHz, 20 MHz channels may respectively transmit one of a first type HE-SIG B (referred to hereinafter as HE-SIG B [1]) and a second type HE-SIG B (referred to hereinafter as HE-SIG B [2]). For example, HE-SIG B [1] and HE-SIG B [2] may be alternately transmitted. An odd-numbered 20 MHz channel may deliver HE-SIG B [1] and an even-numbered 20 MHz channel may deliver HE-SIG B [2]. More specifically, in the case of a 40 MHz bandwidth, HE-SIG B [1] is transmitted over the first 20 MHz channel and HE-SIG B [2] is transmitted over the second 20 MHz channel In the case of an 80 MHz bandwidth, HE-SIG B [1] is transmitted over the first 20 MHz channel, HE-SIG B [2] is transmitted over the second 20 MHz channel, the same HE-SIG B [1] is duplicated and transmitted over the third 20 MHz channel and the same HE-SIG B [2] is duplicated and transmitted over the fourth 20 MHz channel. The HE-SIG B is transmitted in a similar manner in the case of a 160 MHz bandwidth.

As described above, the HE-SIG B can be duplicated and transmitted as the bandwidth increases. Here, a duplicated HE-SIG B may be frequency-hopped by 20 MHz from a 20 MHz channel over which an HE-SIG B of the same type is transmitted and transmitted.

HE-SIG B [1] and HE-SIG B [2] may have different content. However, HE-SIG-Bs [1] have the same content. Similarly, HE-SIG Bs [2] have the same content.

According to an embodiment, HE-SIG B [1] may be configured to include resource allocation information about only odd-numbered 20 MHz channels and HE-SIG B [2] may be configured to include resource allocation information about only even-numbered 20 MHz channels. According to another embodiment of the present invention, HE-SIG B [1] may include resource allocation information about at least part of even-numbered 20 MHz channels or HE-SIG B [2] may include resource allocation information about at least part of odd-numbered 20 MHz channels.

The HE-SIG B may include a common field and a user-specific field. The common field may precede the user-specific field. The common field and the user-specific field may be distinguished in a unit of bit(s) instead of a unit of OFDM symbol(s).

The common field of the HE-SIG B includes information for all STAs designated to receive PPDUs in a corresponding bandwidth. The common field may include resource unit (RU) allocation information. All the HE-SIG Bs [1] may have the same content and All the HE-SIG Bs [2] may have the same content. For example, when four 20 MHz channels constituting 80 MHz are classified as [LL, LR, RL, RR], the common field of HE-SIG B [1] may include a common block for LL and RL and the common field of HE-SIG B [2] may include a common block for LR and RR.

The user-specific field of the HE-SIG B may include a plurality of user fields. Each user field may include information specific to an individual STA designated to receive PPDUs. For example, the user field may include at least one of an STA ID, MCS per STA, the number of streams (Nsts), coding (e.g., indication of use of LDPC), DCM indicator and transmission beamforming information. However, the information of the user field is not limited thereto.

UL MU Transmission

Figure 19:
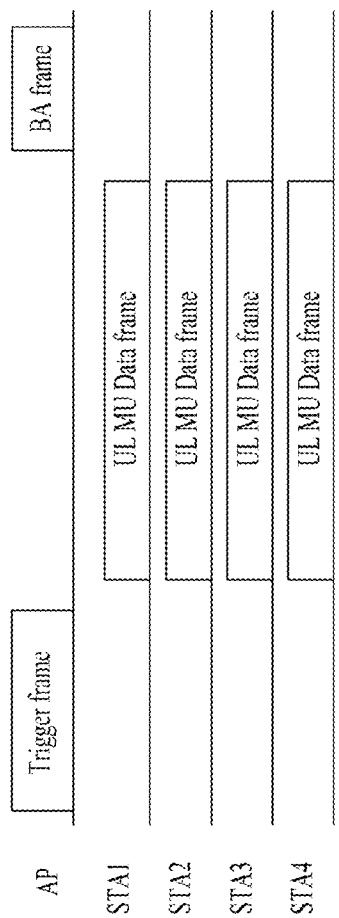
FIG. 19 is an explanatory diagram of uplink multi-user transmission according to an embodiment of the present invention.

FIG. 19 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 19. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

As illustrated in FIG. 19, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

Figure 20:
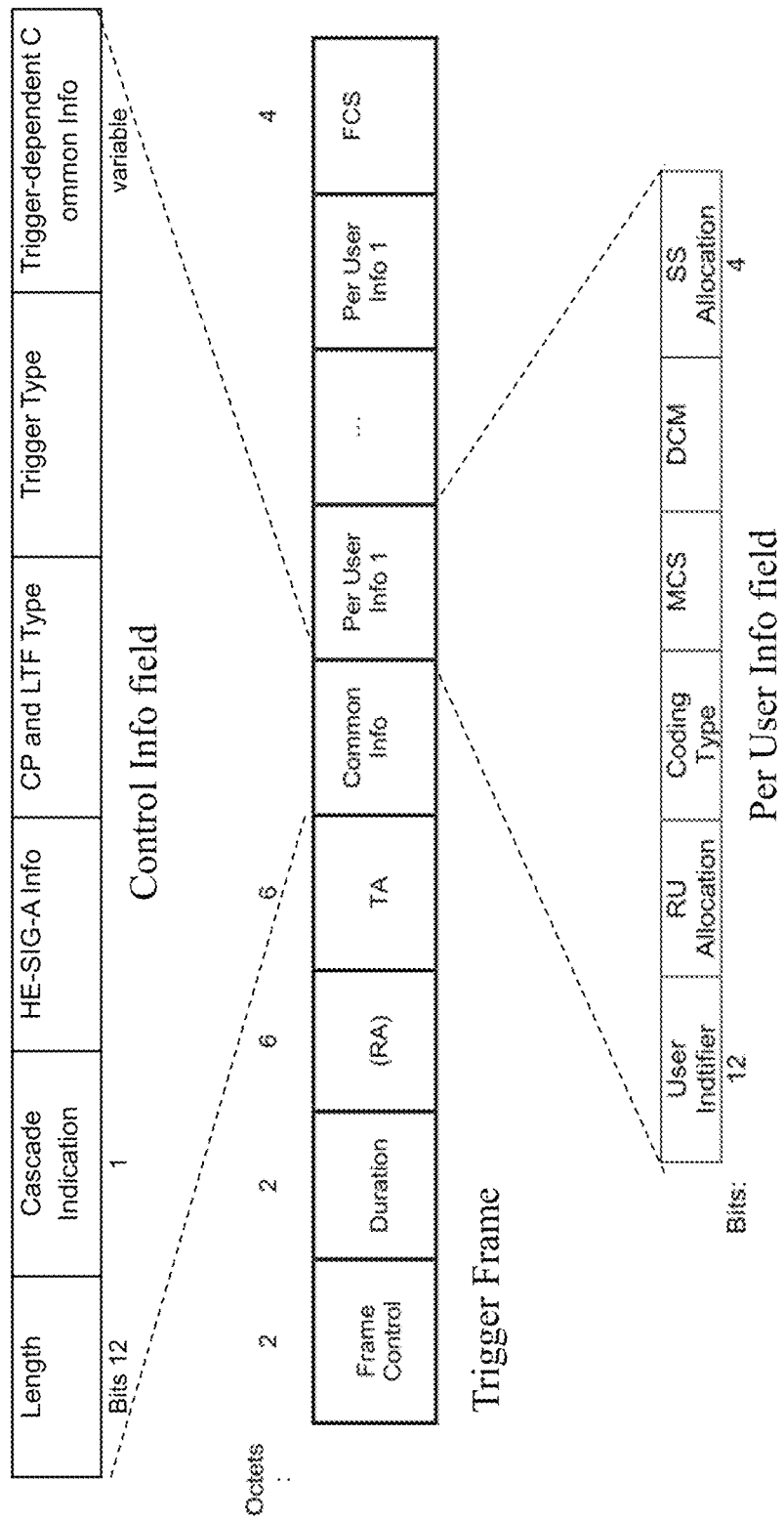
FIG. 20 illustrates a trigger frame format according to an embodiment of the present invention.

FIG. 20 illustrates a trigger frame format according to an embodiment.

Referring to FIG. 20, the trigger frame may include at least one of a frame control field, a duration field, an RA (recipient STA address) field, a TA (transmitting STA address) field, a common information field, one or more Per User Info fields and FCS (Frame Check Sum). The RA field indicates the address or ID of a recipient STA and may be omitted according to embodiments. The TA field indicates the address of a transmitting STA.

The common information field may include at least one of a length subfield, a cascade indication subfield, an HE-SIG A information subfield, a CP/LTF type subfield, a trigger type subfield and a trigger-dependent common information subfield. The length subfield indicates the L-SIG length of a UL MU PPDU. The cascade indication indicates whether there is transmission of a subsequent trigger frame following the current trigger frame. The HE-SIG A information subfield indicates content to be included in the HE-SIG A of the UL MU PPDU. The CP/LTF type subfield indicates a CP and HE LTF type included in the UL MU PPDU. The trigger type subfield indicates the type of the trigger frame. The trigger frame may include common information specific to the type and information per user (Per User Info) specific to the type. For example, the trigger type may be set to one of a basic trigger type (e.g., type 0), beamforming report poll trigger type (e.g., type 1), MU-BAR (Multi-user Block Ack Request) type (e.g., type 2) and MU-RTS (multi-user ready to send) type (e.g., type 3). However the trigger type is not limited thereto. When the trigger type is MU-BAR, the trigger-dependent common information subfield may include a GCR (Groupcast with Retries) indicator and a GCR address.

The Per User Info field may include at least one of a user ID subfield, an RU allocation subfield, a coding type subfield, an MCS subfield, a DCM (dual sub-carrier modulation) subfield, an SS (spatial stream) allocation subfield and a trigger dependent Per User Info subfield. The user ID subfield indicates the AID of an STA which will use a corresponding resource unit to transmit MPDU of the UL MU PPDU. The RU allocation subfield indicates a resource unit used for the STA to transmit the UL MU PPDU. The coding type subfield indicates the coding type of the UL MU PPDU transmitted by the STA. The MCS subfield indicates the MCS of the UL MU PPDU transmitted by the STA. The DCM subfield indicates information about double carrier modulation of the UL MU PPDU transmitted by the STA. The SS allocation subfield indicates information about spatial streams of the UL MU PPDU transmitted by the STA. In the case of MU-BAR trigger type, the trigger-dependent Per User Info subfield may include BAR control and BAR information.

NAV (Network Allocation Vector)

A NAV may be understood as a timer for protecting TXOP of a transmitting STA (e.g., TXOP holder). An STA may not perform channel access during a period in which a NAV configured in the STA is valid so as to protect TXOP of other STAs.

A current non-DMG STA supports one NAV. An STA which has received a valid frame can update the NAV through the duration field of the PSDU (e.g., the duration field of the MAC header). When the RA field of the received frame corresponds to the MAC address of the STA, however, the STA does not update the NAV. When a duration indicated by the duration field of the received frame is greater than the current NAV value of the STA, the STA updates the NAV through the duration of the received frame.

Figure 21:
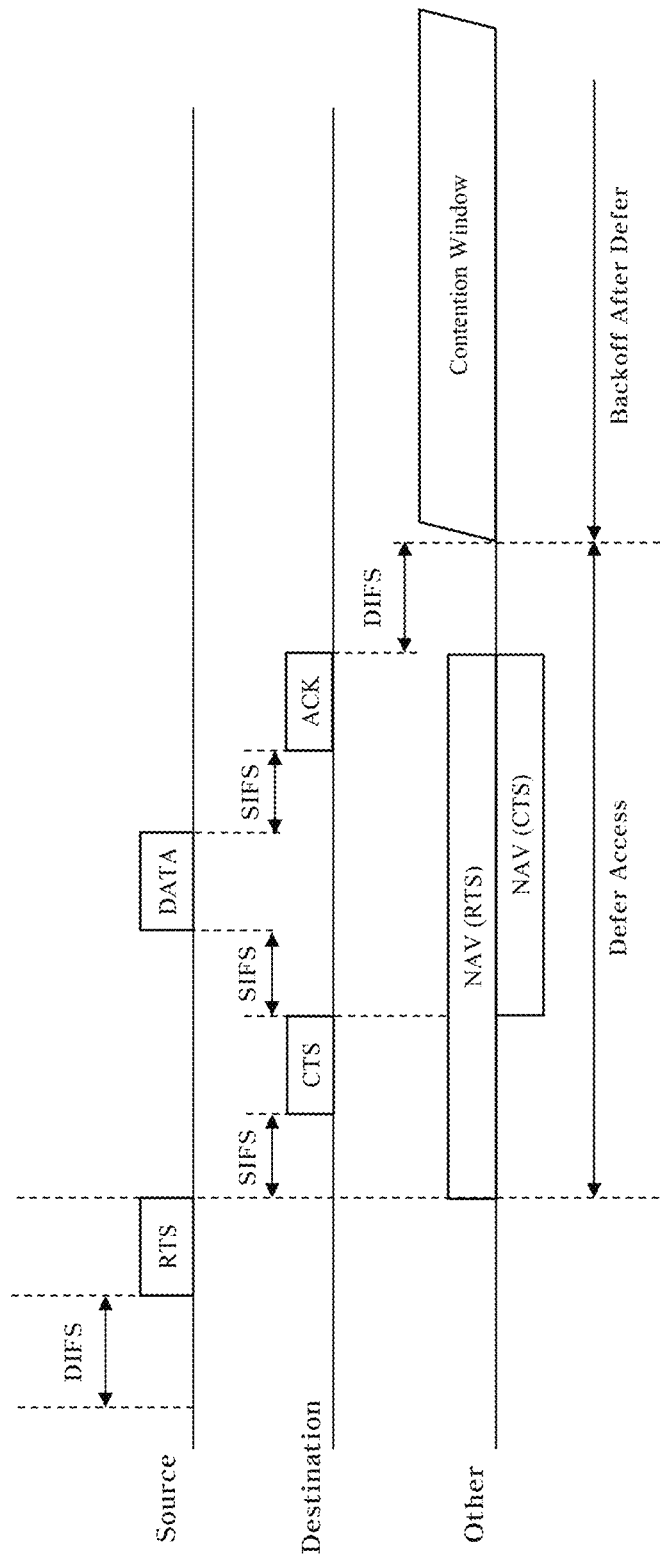
FIG. 21 illustrates an example of NAV setting.

FIG. 21 illustrates an example of NAV setting.

Referring to FIG. 21, a source STA transmits an RTS frame and a destination STA transmits CTS frame. As described above, the destination STA designated as a recipient through the RTS frame does not set a NAV. Some of other STAs may receive the RTS frame and set NAVs and others may receive the CTS frame and set NAVs.

If the CTS frame (e.g., PHY-RXSTART.indication primitive) is not received within a predetermined period from a timing when the RTS frame is received (e.g., PHY-RXEND-.indication primitive for which MAC corresponds to the RTS frame is received), STAs which have set or updated NAVs through the RTS frame can reset the NAVs (e.g., 0). The predetermined period may be (2*aSIFSTime+CTS_Time+aRxPHYStartDelay+2*aSlotTime). The CTS_Time may be calculated on the basis of the CTS frame length indicated by the RTS frame and a data rate.

Although FIG. 21 illustrates setting or update of a NAV through the RTS frame or CTS frame for convenience, NAV setting/resetting/update may be performed on the basis of duration fields of various frames, for example, non-HT PPDU, HT PPDU, VHT PPDU and HE PPDU (e.g., the duration field of the MAC header of the MAC frame). For example, if the RA field of the received MAC frame does not correspond to the address of an STA (e.g., MAC address), the STA may set/reset/update the NAV.

TXOP (Transmission Opportunity) Truncation

Figure 22:
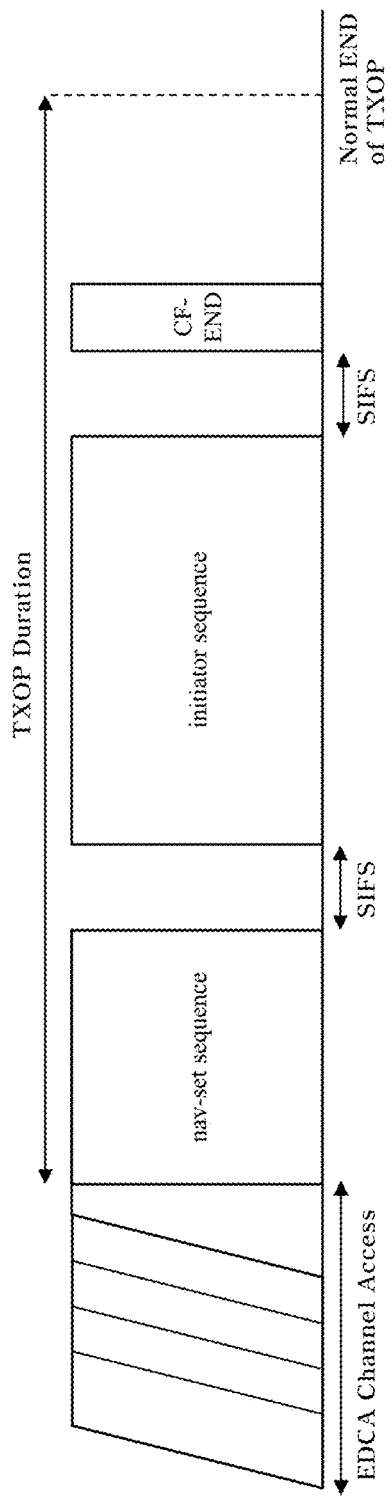
FIG. 22 illustrates an example of TXOP truncation.

FIG. 22 illustrates an example of TXOP truncation.

A TXOP holder STA may indicate to truncate TXOP by transmitting a CF-END frame. AN STA can reset the NAV (e.g., set the NAV to 0) upon reception of a CF-END frame or CF-END+CF-ACK frame.

When an STA that has acquired channel access through EDCA empties a transmission queue thereof, the STA can transmit a CF-END frame. The STA can explicitly indicate completion of TXOP thereof through transmission of the CF-END frame. The CF-END frame may be transmitted by a TXOP holder. A non-AP STA that is not a TXOP holder cannot transmit the CF-END frame. A STA which has received the CF-END frame resets the NAV at a time when a PPDU included in the CF-END frame is ended.

Referring to FIG. 22, an STA that has accessed a medium transmits a sequence (e.g., RTS/CTS) for NAV setting.

After SIFS, a TXOP holder (or TXOP initiator) and a TXOP responder transmit and receive PPDUs (e.g., initiator sequence). The TXOP holder truncates a TXOP by transmitting a CF-END frame when there is no data to be transmitted within the TXOP.

STAs which have received the CF-END frame reset NAYS thereof and can start contending for medium access without delay.

As described above, a TXOP duration is set through the duration field of the MAC header in the current wireless LAN system. That is, a TXOP holder (e.g., Tx STA) and a TXOP responder (e.g., Rx STA) include whole TXOP information necessary for transmission and reception of frames in duration fields of frames transmitted and received therebetween and transmit the frames. Third party STAs other than the TXOP holder and the TXOP responder check the duration fields of frames exchanged between the TXOP holder and the TXOP responder and sets/updates NAVs to defer use of channels until NAV periods.

In an 11ax system supporting the HE PPDU, the third party STAs cannot decode an MPDU included in a UL MU PPDU even when they receive the UL MU PPDU if the UL MU PPDU does not include the HE-SIG B. If the third party STAs cannot decode the MPDU, the third party STAs cannot acquire TXOP duration information (e.g., duration field) included in the MAC header of the MPDU. Accordingly, it is difficult to correctly perform NAV setting/update.

Even when an HE PPDU frame including the HE-SIG B is received, if the HE-SIG B structure is encoded per STA and is designed such that a STA can read only HE-SIG B content allocated to that STA, the third party STAs cannot decode a MAC frame (e.g., an MPDU in the HE PPDU corresponding to other STAS) transmitted and received by other STAs. Accordingly, the third party STAs cannot acquire TXOP information in this case.

TXOP Duration Indication Through HE-SIG A

To solve the aforementioned problem, a method through which an STA includes TXOP duration information in the HE-SIG A and transmits the HE-SIG A is proposed. As described above, 15 bits (e.g., B0 to B14) of the duration field of the MAC header may indicate duration information of up to 32.7 ms (0 to 32767 us). When the 15-bit duration information included in the duration field of the MAC header is included in the HE-SIG A and transmitted, an 11ax third party STA can correctly set/update a NAV. However, HE-SIG A signaling overhead excessively increases. While 15 bits in an MPDU for payload transmission can be regarded as a relatively small size in the MAC layer, the HE-SIG A for common control information transmission in the physical layer is a compactly designed field, and thus an increase of 15 bits in the HE-SIG A corresponds to relatively large signaling overhead.

Accordingly, an embodiment of the present invention proposes an efficient TXOP duration indication method for minimizing HE-SIG A overhead. In addition, an embodiment of the present invention proposes frame transmission and reception operations based on a TXOP duration newly defined in the HE-SIG A. Hereinafter, the duration field included in the MAC header may be referred to as a MAC duration for convenience.

While it is assumed that TXOP duration information is included in the HE SIG A and transmitted in the following description, the scope of the present invention is not limited thereto and the TXOP duration information may be transmitted through other parts (e.g., L-SIG, HE-SIG B, HE-SIG C, . . . , and part of A-MPDU or MPDU). For example, when a TXOP duration is transmitted through the HE-SIG B, the TXOP duration can be transmitted through common information (e.g., common part) of the HE-SIG B or a SIG B contents part (e.g., Per user Info) transmitted at the first (or end) part of the HE-SIG B.

A description will be given of a TXOP duration structure in an HE SIG field and examples indicating the TXOP duration. A value set to the NAV of a third party STA can be interpreted as a TXOP duration for a TXOP holder/responder. For example, a duration field value is a TXOP for frame transmission and reception in view of the TXOP holder/responder. However, the duration field value refers to a NAV value in view of the third party STA. Accordingly, a NAV setting/update operation of the third party STA may be referred to as a TXOP setting/update operation because the NAV setting/update operation sets a NAV corresponding to a TXOP for the TXOP holder/responder. Furthermore, the term "TXOP duration" may be simply referred to as "duration" or "TXOP". The TXOP duration may be used to indicate a field (e.g., the TXOP duration field of the HE-SIG A) in a frame or to indicate an actual TXOP duration value.

Indices assigned to examples described below are for convenience of description and thus examples having different indices may be combined to embody one invention or respective examples may embody respective inventions.

EXAMPLE 1

The TXOP duration may be set to $2^N-1$ (or $2^N$). It is assumed that the TXOP duration is set to $2^N-1$ for convenience. The value N can be transmitted in the TXOP duration field of the HE-SIG A.

For example, when N is 4 bits, N has a value in the range of 0 to 15. Accordingly, the TXOP duration indicated through N having a size of 4 bits may have a value in the range of 0 to 32,767 μs. When the TXOP duration is set to indicate a maximum of 5 ms, only N=0 to 13 may be used to indicate the TXOP duration and N=14 and N=15 may be used for other purposes.

This example is one of methods for indicating the TXOP duration through $X*2^Y-1$ (e.g., X=1), X and/or Y may be changed in various manners. In addition, values X and Y may be transmitted through the HE-SIG A field.

EXAMPLE 2

According to an embodiment of the present invention, the TXOP duration may be set to $X^Y-1$ (or $X^Y$). It is assumed that the TXOP duration is set to $X^Y-1$. AN STA can transmit values X and Y through the TXOP duration field (e.g., in the HE-SIG A).

If the TXOP duration field transmitted in the HE-SIG A is K bits, n bits (first n bits) of the K bits may indicate the value X and m bits thereof (e.g., m bits at the end) may indicate the value Y. The n bits may be n MSBs or n LSBs and the m bits may be m LSBs or m MSBs. The values K, m and n can be set in various manners.

(i) For example, it is assumed that K=6, n=3 and m=3. When X□{2~9} and Y□{0~7}, the TXOP duration may have a value in the range of 0 to 4,782,968 μs.

(ii) In another example, it is assumed that K=5, n=2 and m=3. When X□{2~5} and Y□{0~7}, the TXOP duration may have a value in the range of 0 to 78,124 μs. If X□{2, 3, 5, 6} and Y□{0~7}, the TXOP duration may have a value in the range of 0 to 78,124 μs.

(iii) In another example, it is assumed that K=4, n=1 and m=3. When X□{2, 3} (or X□{5, 6}) and Y□{0~7}, the TXOP duration may have a value in the range of 0 to 279,963 μs.

If a maximum of P ms (e.g., 5 ms) is indicated through the TXOP duration field (e.g., in the HE-SIG A), an (X, Y) combination that minimizes $X^Y-1$, from among (X, Y) combinations satisfying $X^Y-1 \geq P$ ms (e.g., 5ms), may be used to indicate a maximum TXOP duration value and other (X, Y) combinations may not be used.

This example is one of methods of indicating the TXOP duration through $Z*X^Y-1$ and thus X, Y and/or Z may be changed in various manners.

EXAMPLE 3

According to an embodiment of the present invention, the TXOP duration may be set to $X*2^Y-1$ (or $X*2^Y$). Values X and Y can be transmitted through the TXOP duration field.

If the TXOP duration field transmitted in the HE-SIG A is K bits, n bits (first n bits) of the K bits may indicate the value X and m bits thereof (e.g., m bits at the end) may indicate the value Y. The n bits may be n MSBs or n LSBs and the m bits may be m LSBs or m MSBs. The values K, m and n can be set in various manners.

For example, it is assumed that K=6, n=3 and m=3. When X□{1, 5, 10, 20, 30, 40, 50, 60} and Y□{0~7}, the TXOP duration may have a value in the range of 0 to 7,680μs.

If a maximum of P ms (e.g., 5 ms) is indicated through the TXOP duration field (e.g., in the HE-SIG A), an (X, Y) combination that minimizes $X*2^Y-1$, from among (X, Y) combinations satisfying $X*2^Y-1 \geq P$ ms (e.g., 5ms), may be used to indicate a maximum TXOP duration value and other (X, Y) combinations may not be used.

This example is one of methods of indicating the TXOP duration through $X * Z^Y-1$ and thus X, Y and/or Z may be changed in various manners.

EXAMPLE 4

According to an embodiment, the TXOP duration may be set in other units instead of 1 microsecond (μs) (e.g., larger units or the unit of a symbol). For example, larger units such as 4 μs, 8 μs, 10 μs, 16 μs, 32 μs, 50 μs, 64 μs, 100 μs, 128 μs, 256 μs, 500 μs, 512 μs, 1024 . . . can be used. In this case, the TXOP duration value may be determined as "unit (e.g., 64 μs)*value of TXOP duration field". For example, in the case of 32 μs, TXOP Duration (1)=32 μs, TXOP Duration (2)=64 μs, TXOP Duration (3)=96 μs, . . . .

Meanwhile, it is desirable that the TXOP duration have a maximum value of 8 ms. Accordingly, in a case where a single unit is used, the following TXOP duration field options may be considered.

Option 1: A unit of 32 μs is used an 8-bit TXOP duration field is defined. Here, the maximum TXOP duration value can be 8,192 μs.

Option 2: A unit of 64 μs is used and a 7-bit TXOP duration field is defined. Here, the maximum TXOP duration value can be 8,192 μs.

If the TXOP field is set to more than 8 bits (e.g., 9 to 11 bits), the following TXOP duration field structures may be used.

Option 1-1: 16 μs unit, ~32 ms, 11 bits
Option 1-2: 16 μs unit, ~16 ms, 10 bits
Option 1-3: 16 μs unit, ~8 ms, 9 bits
Option 2-1: 32 μs unit, ~32 ms, 10 bits
Option 2-2: 32 μs unit, ~16 ms, 9 bits
Option 3-1: 64 μs unit, ~16 ms, 9 bits In addition, a combination of one or more units (e.g., (16 μs, 512 μs) or (8 μs, 128 μs), etc.) may be used. Or, 1x symbol or 4x symbol unit may be used instead of μs, or the TXOP duration may be indicated by N*1x symbols or N*4x symbols (N being a natural number).

Table 1 illustrates a TXOP duration indicated by 4x symbols.

TABLE 1

| TXOP duration field | Actual value (units: 4x symbol) |
|---|---|
| 0 | 0 |
| 1 | 1 4x symbol (i.e., 16 μs) |
| 2 | 2 4x symbols (i.e., 32 μs) |
| 3 | 3 4x symbols (i.e., 48 μs) |
| 4 | 4 4x symbols (i.e., 64 μs) |
| 5 | 5 4x symbols (i.e., 80 μs) |
| ... | ... |

The TXOP duration may be indicated by a combination of one of examples 1/2/3 and example 4.

EXAMPLE 5

According to an embodiment, the TXOP duration field may have a predefined value. A table in which values (e.g., a TXOP duration index) set to the TXOP duration field and actual TXOP duration values are mapped may be predefined. Table 2 illustrates TXOP duration indices.

TABLE 2

| TXOP duration field | Actual value (units: μs) |
|---|---|
| 0 | A |
| 1 | B |
| 2 | C |
| 3 | D |
| 4 | E |
| 5 | F |
| ... | ... |

According to an embodiment, part of the range of the TXOP duration may be represented/configured as a first function form and another part of the range may be represented/configured as a second function form. For example, TXOP duration values may be set such that TXOP duration values increase in an exponential function to a specific value and TXOP duration values following the specific value increase in a uniform distribution function.

Table 3 illustrates a case in which the TXOP duration field is set to 4 bits. Referring to Table 3, the TXOP duration exponentially increases in the range of 32 μs to 512 μs (or 1,024 μs) and increases by 512 μs (approximately 0.5 ms) after 512 μs (or 1,024 μs).

TABLE 3

| TXOP Duration field | Actual value (units: us) |
|---|---|
| 0 | 0 |
| 1 | 32 |
| 2 | 64 |
| 3 | 128 |
| 4 | 256 |
| 5 | 512 |
| 6 | 1024 |
| 7 | 1536 |
| 8 | 2048 |
| 9 | 2560 |
| 10 | 3072 |
| 11 | 3584 |
| 12 | 4096 |
| 13 | 4608 |
| 14 | 5120 |
| 15 | 5632 |

Table 4 illustrates a case in which the TXOP duration field is set to 5 bits. Referring to Table 4, the TXOP duration exponentially increases in the range of 32 μs to 256 μs (or 512 μs) and increases by 256 μs (approximately 0.25 ms) after 256 μs (or 512 μs).

TABLE 4

| TXOP Duration field | Actual value (units: us) |
|---|---|
| 0 | 0 |
| 1 | 32 |
| 2 | 64 |
| 3 | 128 |
| 4 | 256 |
| 5 | 512 |
| 6 | 768 |
| 7 | 1024 |
| 8 | 1280 |
| 9 | 1536 |
| 10 | 1792 |
| 11 | 2048 |
| 12 | 2304 |
| 13 | 2560 |
| 14 | 2816 |
| 15 | 3072 |
| 16 | 3382 |
| 17 | 3584 |
| 18 | 3840 |
| 19 | 4096 |
| 20 | 4352 |
| 21 | 4608 |
| 22 | 4864 |
| 23 | 5120 |
| 24 | 5376 |
| 25 | 5632 |
| 26 | 5888 |
| 27 | Reserved |
| 28 | Reserved |
| 29 | Reserved |
| 30 | Reserved |
| 31 | Reserved |

The following table 5 shows various examples of TXOP values indicated by indices of a 4-bit TXOP duration field. Cases A to H of Table 5 can represent different examples.

TABLE 5

| TXOP index | case A | case B | case C | case D | case E | case F | case G | case H |
|---|---|---|---|---|---|---|---|---|
| 0 (b0000) | 0 | 16 | 0 | 32 | 0 | 0 | 0 | 0 |
| 1 (b0001) | 16 | 32 | 32 | 64 | 8 | 16 | 8 | 16 |
| 2 (b0010) | 32 | 48 | 64 | 96 | 16 | 32 | 16 | 32 |
| 3 (b0011) | 48 | 64 | 96 | 128 | 32 | 64 | 32 | 64 |
| 4 (b0100) | 64 | 80 | 128 | 160 | 64 | 128 | 64 | 128 |
| 5 (b0101) | 80 | 96 | 160 | 192 | 128 | 256 | 128 | 256 |
| 6 (b0110) | 96 | 112 | 192 | 224 | 256 | 512 | 256 | 512 |
| 7 (b0111) | 112 | 128 | 224 | 256 | 512 | 1024 | 512 | 1024 |
| 8 (b1000) | 512 | 512 | 512 | 512 | 1024 | 1536 | 1024 | 2048 |
| 9 (b1001) | 1024 | 1024 | 1024 | 1024 | 1536 | 2048 | 2048 | 3072 |
| 10 (b1010) | 1536 | 1536 | 1536 | 1536 | 2048 | 2560 | 3072 | 4096 |
| 11 (b1011) | 2048 | 2048 | 2048 | 2048 | 2560 | 3072 | 4096 | 5120 |
| 12 (b1100) | 2560 | 2560 | 2560 | 2560 | 3072 | 3584 | 5120 | 6144 |
| 13 (b1101) | 3072 | 3072 | 3072 | 3072 | 3584 | 4096 | 6144 | 7168 |
| 14 (b1110) | 3584 | 3584 | 3584 | 3584 | 4096 | 4608 | 7168 | 8192 |
| 15 (b1111) | 4096 | 4096 | 4096 | 4096 | 4608 | 5120 | 8192 | 9216 |

(i) In case A, the TXOP duration value is determined as (16 μs*(the value of the remaining 3 bits)) when the MSB of the indices is 0. The TXOP duration value is determined as (512 μs*(the value of the remaining 3 bits)+1) when the MSB of the indices is 1.

(ii) In case B, the TXOP duration value is determined as (16 μs*(the value of the remaining 3 bits)+1) when the MSB of the indices is 0. The TXOP duration value is determined as (512 μs*(the value of the remaining 3 bits)+1) when the MSB of the indices is 1.

(iii) In case C, the TXOP duration value is determined as (32 μs*(the value of the remaining 3 bits)) when the MSB of the indices is 0. The TXOP duration value is determined as (512 μs*(the value of the remaining 3 bits)+1) when the MSB of the indices is 1.

(iv) In case D, the TXOP duration value is determined as (32 μs*(the value of the remaining 3 bits)+1) when the MSB of the indices is 0. The TXOP duration value is determined as (512 μs*(the value of the remaining 3 bits)+1) when the MSB of the indices is 1.

(v) In cases E to H, the TXOP duration value can be understood as in (i) to (iv). For example, the MSB of the indices can be understood as a scaling factor, granularity or duration unit of the TXOP duration (refer to embodiments which will be described below).

EXAMPLE 6

According to an embodiment, the TXOP duration can be set through an X-bit scaling factor and a Y-bit duration value. For example, the TXOP duration can be set on the basis of Scaling factor (X bits)*Duration (Y bits). Specifically, TXOP duration=Scaling factor (X bits)*Duration (Y bits). Otherwise, TXOP duration=Scaling factor (X bits)*Duration (Y bits)+a, a being a predetermined constant (e.g., a=1).

The size of the TXOP duration field can be set to X+Y bits.

For example, the unit of the duration value can be set to one of 1 μs, 4 μs and 16 μs according to the scaling factor. The length of the Y bits can be set to various values.

Scaling factor index 0 of the X bits can indicate actual scaling factor=0. Case A and case B of Table 6 show examples of a 2-bit scaling factor.

TABLE 6

| Scaling factor field | Value | |
|---|---|---|
| | Case A | Case B |
| 0 | 0 | 0 |
| 1 | 4 | 1 |
| 2 | 16 | 10 |
| 3 | 32 | 100 |

Table 7 shows examples of a 3-bit scaling factor.

TABLE 7

| Scaling factor field | Value |
|---|---|
| 0 | 0 |
| 1 | 1 |
| 2 | 4 |
| 3 | 16 |
| 4 | 32 |
| 5 | 64 |
| 6 | 128 |
| 7 | 256 |

The duration value may be represented in the form of $2^Y$.

Table 8 illustrates a scaling factor set to 1 bit. Referring to Table 8, scaling factor=0 can indicate 16 μs and scaling factor=1 can indicate 512 μs. For example, the TXOP duration can be set to 16*Duration (μs) when scaling factor=0 and set to 512* Duration (μs) when scaling factor=1. The unit of Duration is assumed to be 1 μs for convenience.

TABLE 8

| Scaling factor field | Value (us) |
|---|---|
| 0 | 16 |
| 1 | 512 |

Table 9 shows examples of a 5-bit TXOP duration field. In Table 9, it is assumed that the scaling factor is set to the MSB as in Table 8. Accordingly, the remaining 4 bits other than the MSB used as the scaling factor in the 5-bit TXOP Duration field are used as a duration field value, and thus the 4-bit duration field value can be one of 0 to 15.

Case A of Table 9 shows an example in which the actual TXOP duration value is set to (Scaling factor value*Duration field value) (e.g., a value of 4 bits other than the MSB).

Case B of Table 9 shows an example in which the actual TXOP duration value is set to (Scaling factor value *(Duration field value+1)).

In Case C of Table 9, the actual TXOP duration value is set to (Scaling factor value (16 μs)*Duration field value) when scaling factor=0 (e.g., the unit of the scaling factor value is 16 μs) and set to (Scaling factor value (512 μs)*(Duration field value+1)) when scaling factor=1 (e.g., the unit of the scaling factor value is 512 μs).

TABLE 9

| TXOP Duration field | Actual value (unit: us) | | |
|---|---|---|---|
| (MSB: Scaling factor) | Case A | Case B | Case C |
| 0 | 0 | 16 | 0 |
| 1 | 16 | 32 | 16 |
| 2 | 32 | 48 | 32 |
| 3 | 48 | 64 | 48 |
| 4 | 64 | 80 | 64 |
| 5 | 80 | 96 | 80 |
| 6 | 96 | 112 | 96 |
| 7 | 112 | 128 | 112 |
| 8 | 128 | 144 | 128 |
| 9 | 144 | 160 | 144 |
| 10 | 160 | 176 | 160 |
| 11 | 176 | 192 | 176 |
| 12 | 192 | 208 | 192 |
| 13 | 208 | 224 | 208 |
| 14 | 224 | 240 | 224 |
| 15 | 240 | 256 | 240 |
| 16 | 0 | 512 | 512 |
| 17 | 512 | 1024 | 1024 |
| 18 | 1024 | 1536 | 1536 |
| 19 | 1536 | 2048 | 2048 |
| 20 | 2048 | 2560 | 2560 |
| 21 | 2560 | 3072 | 3072 |
| 22 | 3072 | 3584 | 3584 |
| 23 | 3584 | 4096 | 4096 |
| 24 | 4096 | 4608 | 4608 |
| 25 | 4608 | 5120 | 5120 |
| 26 | 5120 | 5632 | 5632 |
| 27 | 5632 | 6144 | 6144 |
| 28 | 6144 | 6656 | 6656 |
| 29 | 6656 | 7168 | 7168 |
| 30 | 7168 | 7680 | 7680 |
| 31 | 7680 | 8192 | 8192 |

Table 10 shows other examples of the 1-bit scaling factor. Referring to Table 10, scaling factor=0 can indicate 32 μs and scaling factor=1 can indicate 512 μs.

TABLE 10

| Scaling factor field | Value (us) |
|---|---|
| 0 | 32 |
| 1 | 512 |

Table 11 shows other examples of the 5-bit TXOP duration field. In Table 11, it is assumed that the scaling factor is set to the MSB as in Table 9. Accordingly, the remaining 4 bits other than the MSB used as the scaling factor in the 5-bit TXOP Duration field are used as a duration field value, and thus the 4-bit duration field value can be one of 0 to 15. Referring to Table 11, the actual TXOP duration value can be set to 32*Duration (μs) when scaling factor=0 and set to 512*(Duration+1) (μs) when scaling factor=1. The unit of Duration is assumed to be 1 μs for convenience.

TABLE 11

| TXOP Duration field (MSB: Scaling factor) | Actual value (unit: us) |
|---|---|
| 0 | 0 |
| 1 | 32 |
| 2 | 64 |
| 3 | 96 |
| 4 | 128 |
| 5 | 160 |
| 6 | 192 |
| 7 | 224 |
| 8 | 256 |
| 9 | 288 |
| 10 | 320 |
| 11 | 352 |
| 12 | 384 |
| 13 | 416 |
| 14 | 448 |
| 15 | 480 |
| 16 | 512 |
| 17 | 1024 |
| 18 | 1536 |
| 19 | 2048 |
| 20 | 2560 |
| 21 | 3072 |
| 22 | 3584 |
| 23 | 4096 |
| 24 | 4608 |
| 25 | 5120 |
| 26 | 5632 |
| 27 | 6144 |
| 28 | 6656 |
| 29 | 7168 |
| 30 | 7680 |
| 31 | 8192 |

Table 12 shows other examples of the 1-bit scaling factor. Referring to FIG. 12, scaling factor=0 can indicate 32 μs and scaling factor=1 can indicate 1,024 μs.

TABLE 12

| Scaling factor field | Value (us) |
|---|---|
| 0 | 32 |
| 1 | 1024 |

Table 13 shows other examples of the 5-bit TXOP duration field. In Table 13, it is assumed that the scaling factor as in Table 12 is set to the MSB. Accordingly, the remaining 4 bits other than the MSB used as the scaling factor in the 5-bit TXOP Duration field are used as a duration field value, and thus the 4-bit duration field value can be one of 0 to 15. Referring to Table 13, the actual TXOP duration value can be set to 32*Duration (μs) when scaling factor=0 and set to 1,024*(Duration+1) (μs) when scaling factor=1. The unit of Duration is assumed to be 1 μs for convenience.

TABLE 13

| TXOP Duration field (MSB: Scaling factor) | Actual value (unit: us) |
|---|---|
| 0 | 32 |
| 1 | 64 |
| 2 | 96 |
| 3 | 128 |
| 4 | 160 |
| 5 | 192 |
| 6 | 224 |
| 7 | 256 |
| 8 | 288 |
| 9 | 320 |
| 10 | 352 |

TABLE 13-continued

| TXOP Duration field (MSB: Scaling factor) | Actual value (unit: us) |
| --- | --- |
| 11 | 384 |
| 12 | 416 |
| 13 | 448 |
| 14 | 480 |
| 15 | 512 |
| 16 | 1024 |
| 17 | 2048 |
| 18 | 3072 |
| 19 | 4096 |
| 20 | 5120 |
| 21 | 6144 |
| 22 | 7168 |
| 23 | 8192 |
| 24 | 9216 |
| 25 | 10240 |
| 26 | 11264 |
| 27 | 12288 |
| 28 | 13312 |
| 29 | 14336 |
| 30 | 15360 |
| 31 | 16384 |

Table 14 shows examples of a 6-bit TXOP duration field. In Table 14, it is assumed that a 1-bit scaling factor is set to the MSB as in Table 8. Accordingly, the remaining 5 bits other than the MSB used as the scaling factor in the 6-bit TXOP Duration field are used as a duration field value, and thus the 5-bit duration field value can be one of 0 to 31. Referring to Table 14, the actual TXOP duration value can be set to 16*Duration (µs) when scaling factor=0 and set to 512*(Duration+1) (µs) when scaling factor=1. The unit of Duration is assumed to be 1 µs for convenience.

TABLE 14

| TXOP Duration field | Actual value (unit: us) |
| --- | --- |
| 0 | 0 |
| 1 | 16 |
| 2 | 32 |
| 3 | 48 |
| 4 | 64 |
| 5 | 80 |
| 6 | 96 |
| 7 | 112 |
| 8 | 128 |
| 9 | 144 |
| 10 | 160 |
| 11 | 176 |
| 12 | 192 |
| 13 | 208 |
| 14 | 224 |
| 15 | 240 |
| 16 | 256 |
| 17 | 272 |
| 18 | 288 |
| 19 | 304 |
| 20 | 320 |
| 21 | 336 |
| 22 | 352 |
| 23 | 368 |
| 24 | 384 |
| 25 | 400 |
| 26 | 416 |
| 27 | 432 |
| 28 | 448 |
| 29 | 464 |
| 30 | 480 |
| 31 | 496 |
| 32 | 512 |
| 33 | 1024 |
| 34 | 1536 |

TABLE 14-continued

| TXOP Duration field | Actual value (unit: us) |
| --- | --- |
| 35 | 2048 |
| 36 | 2560 |
| 37 | 3072 |
| 38 | 3584 |
| 39 | 4096 |
| 40 | 4608 |
| 41 | 5120 |
| 42 | 5632 |
| 43 | 6144 |
| 44 | 6656 |
| 45 | 7168 |
| 46 | 7680 |
| 47 | 8192 |
| 48 | 8704 |
| 49 | 9216 |
| 50 | 9728 |
| 51 | 10240 |
| 52 | 10752 |
| 53 | 11264 |
| 54 | 11776 |
| 55 | 12288 |
| 56 | 12800 |
| 57 | 13312 |
| 58 | 13824 |
| 59 | 14366 |
| 60 | 14848 |
| 61 | 15360 |
| 62 | 15872 |
| 63 | 16384 |

Table 15 shows other examples of the 6-bit TXOP duration field. In Table 15, it is assumed that the 1-bit scaling factor is set to the MSB as in Table 8. Accordingly, the remaining 5 bits other than the MSB used as the scaling factor in the 6-bit TXOP Duration field are used as a duration field value, and thus the 5-bit duration field value can be one of 0 to 31. Referring to Table 15, the actual TXOP duration value can be set to 16*(Duration+1) (µs) when scaling factor=0 and set to 512*(Duration+1) (µs) when scaling factor=1. The unit of Duration is assumed to be 1 µs for convenience.

TABLE 15

| TXOP Duration field | Actual value |
| --- | --- |
| 0 | 16 |
| 1 | 32 |
| 2 | 48 |
| 3 | 64 |
| 4 | 80 |
| 5 | 96 |
| 6 | 112 |
| 7 | 128 |
| 8 | 144 |
| 9 | 160 |
| 10 | 176 |
| 11 | 192 |
| 12 | 208 |
| 13 | 224 |
| 14 | 240 |
| 15 | 256 |
| 16 | 272 |
| 17 | 288 |
| 18 | 304 |
| 19 | 320 |
| 20 | 336 |
| 21 | 352 |
| 22 | 368 |
| 23 | 384 |
| 24 | 400 |
| 25 | 416 |

TABLE 15-continued

| TXOP Duration field | Actual value |
|---|---|
| 26 | 432 |
| 27 | 448 |
| 28 | 464 |
| 29 | 480 |
| 30 | 496 |
| 31 | 512 |
| 32 | 512 |
| 33 | 1024 |
| 34 | 1536 |
| 35 | 2048 |
| 36 | 2560 |
| 37 | 3072 |
| 38 | 3584 |
| 39 | 4096 |
| 40 | 4608 |
| 41 | 5120 |
| 42 | 5632 |
| 43 | 6144 |
| 44 | 6656 |
| 45 | 7168 |
| 46 | 7680 |
| 47 | 8192 |
| 48 | 8704 |
| 49 | 9216 |
| 50 | 9728 |
| 51 | 10240 |
| 52 | 10752 |
| 53 | 11264 |
| 54 | 11776 |
| 55 | 12288 |
| 56 | 12800 |
| 57 | 13312 |
| 58 | 13824 |
| 59 | 14336 |
| 60 | 14848 |
| 61 | 15360 |
| 62 | 15872 |
| 63 | 16384 |

Table 16 shows other examples of the 6-bit TXOP duration field. In Table 16, it is assumed that the 1-bit scaling factor is set to the MSB as in Table 10. Accordingly, the remaining 5 bits other than the MSB used as the scaling factor in the 6-bit TXOP Duration field are used as a duration field value, and thus the 5-bit duration field value can be one of 0 to 31. Referring to Table 16, the actual TXOP duration value can be set to 32*Duration (μs) when scaling factor=0 and set to 512*(Duration+2) (μs) when scaling factor=1. The unit of Duration is assumed to be 1 μs for convenience.

TABLE 16

| TXOP Duration field | Actual value (unit: us) |
|---|---|
| 0 | 0 |
| 1 | 32 |
| 2 | 64 |
| 3 | 96 |
| 4 | 128 |
| 5 | 160 |
| 6 | 192 |
| 7 | 224 |
| 8 | 256 |
| 9 | 288 |
| 10 | 320 |
| 11 | 352 |
| 12 | 384 |
| 13 | 416 |
| 14 | 448 |
| 15 | 480 |
| 16 | 512 |
| 17 | 544 |
| 18 | 576 |
| 19 | 608 |
| 20 | 640 |
| 21 | 672 |
| 22 | 704 |
| 23 | 736 |
| 24 | 768 |
| 25 | 800 |
| 26 | 832 |
| 27 | 864 |
| 28 | 896 |
| 29 | 928 |
| 30 | 960 |
| 31 | 992 |
| 32 | 1024 |
| 33 | 1536 |
| 34 | 2048 |
| 35 | 2560 |
| 36 | 3072 |
| 37 | 3584 |
| 38 | 4096 |
| 39 | 4608 |
| 40 | 5120 |
| 41 | 5632 |
| 42 | 6144 |
| 43 | 6656 |
| 44 | 7168 |
| 45 | 7680 |
| 46 | 8192 |
| 47 | 8704 |
| 48 | 9216 |
| 49 | 9728 |
| 50 | 10240 |
| 51 | 10752 |
| 52 | 11264 |
| 53 | 11776 |
| 54 | 12288 |
| 55 | 12800 |
| 56 | 13312 |
| 57 | 13824 |
| 58 | 14336 |
| 59 | 14848 |
| 60 | 15360 |
| 61 | 15872 |
| 62 | 16384 |
| 63 | 16896 |

Table 17 shows other examples of the 6-bit TXOP duration field. In Table 17, it is assumed that the 1-bit scaling factor is set to the MSB as in Table 12. Accordingly, the remaining 5 bits other than the MSB used as the scaling factor in the 6-bit TXOP Duration field are used as a duration field value, and thus the 5-bit duration field value can be one of 0 to 31. Referring to Table 17, the actual TXOP duration value can be set to 32*Duration (μs) when scaling factor=0 and set to 1,024*(Duration+1) (μs) when scaling factor=1. The unit of Duration is assumed to be 1 μs for convenience.

TABLE 17

| TXOP Duration field | Actual value (unit: us) |
|---|---|
| 0 | 0 |
| 1 | 32 |
| 2 | 64 |
| 3 | 96 |
| 4 | 128 |
| 5 | 160 |
| 6 | 192 |
| 7 | 224 |
| 8 | 256 |
| 9 | 288 |

TABLE 17-continued

| TXOP Duration field | Actual value (unit: us) |
|---|---|
| 10 | 320 |
| 11 | 352 |
| 12 | 384 |
| 13 | 416 |
| 14 | 448 |
| 15 | 480 |
| 16 | 512 |
| 17 | 544 |
| 18 | 576 |
| 19 | 608 |
| 20 | 640 |
| 21 | 672 |
| 22 | 704 |
| 23 | 736 |
| 24 | 768 |
| 25 | 800 |
| 26 | 832 |
| 27 | 864 |
| 28 | 896 |
| 29 | 928 |
| 30 | 960 |
| 31 | 992 |
| 32 | 1024 |
| 33 | 1536 |
| 34 | 2048 |
| 35 | 2560 |
| 36 | 3072 |
| 37 | 3584 |
| 38 | 4096 |
| 39 | 4608 |
| 40 | 5120 |
| 41 | 5632 |
| 42 | 6144 |
| 43 | 6656 |
| 44 | 7168 |
| 45 | 7680 |
| 46 | 8192 |
| 47 | 8704 |
| 48 | 9216 |
| 49 | 9728 |
| 50 | 10240 |
| 51 | 10752 |
| 52 | 11264 |
| 53 | 11776 |
| 54 | 12288 |
| 55 | 12800 |
| 56 | 13312 |
| 57 | 13824 |
| 58 | 14336 |
| 59 | 14848 |
| 60 | 15360 |
| 61 | 15872 |
| 62 | 16384 |
| 63 | 16896 |

Table 18 shows other examples of the 6-bit TXOP duration field. Referring to Table 18, the actual TXOP duration value increases in units of 32 μs until 512 μs and increases in units of 512 μs after 512 μs.

TABLE 18

| TXOP Duration field | Actual value (unit: us) |
|---|---|
| 0 | 0 |
| 1 | 32 |
| 2 | 64 |
| 3 | 96 |
| 4 | 128 |
| 5 | 160 |
| 6 | 192 |
| 7 | 224 |
| 8 | 256 |
| 9 | 288 |

TABLE 18-continued

| TXOP Duration field | Actual value (unit: us) |
|---|---|
| 10 | 320 |
| 11 | 352 |
| 12 | 384 |
| 13 | 416 |
| 14 | 448 |
| 15 | 480 |
| 16 | 512 |
| 17 | 1024 |
| 18 | 1536 |
| 19 | 2048 |
| 20 | 2560 |
| 21 | 3072 |
| 22 | 3584 |
| 23 | 4096 |
| 24 | 4608 |
| 25 | 5120 |
| 26 | 5632 |
| 27 | 6144 |
| 28 | 6656 |
| 29 | 7168 |
| 30 | 7680 |
| 31 | 8192 |
| 32 | 8704 |
| 33 | 9216 |
| 34 | 9728 |
| 35 | 10240 |
| 36 | 10752 |
| 37 | 11264 |
| 38 | 11776 |
| 39 | 12288 |
| 40 | 12800 |
| 41 | 13312 |
| 42 | 13824 |
| 43 | 14336 |
| 44 | 14848 |
| 45 | 15360 |
| 46 | 15872 |
| 47 | 16384 |
| 48 | 16896 |
| 49 | 17408 |
| 50 | 17920 |
| 51 | 18432 |
| 52 | 18944 |
| 53 | 19456 |
| 54 | 19968 |
| 55 | 20480 |
| 56 | 20992 |
| 57 | 21504 |
| 58 | 22016 |
| 59 | 22528 |
| 60 | 23040 |
| 61 | 23552 |
| 62 | 24064 |
| 63 | 24576 |

EXAMPLE 7

According to an embodiment, the TXOP duration may be indicated through X-bit scaling factor, Y-bit duration value and Z-bit duration unit information. The TXOP duration may be "Scaling factor (X bits)*(Duration (Y bits) μs*Duration unit (Z bits) μs)." The size of the TXOP duration field may be set to (X+Y+Z) bits.

The Z-bit duration unit represents the unit of transmitted duration information. For example, when the Z bit is 1 bit, 0 can indicate the unit of 4 μs and 1 can indicate the unit of 16 μs. However, the present invention is not limited thereto.

EXAMPLE 8

When the TXOP duration field is included in the HE-SIG A of the HE PPDU, the length of the TXOP duration, granularity and the like indicated by the TXOP duration field need to be defined. For example, (1) size, (2) maximum value and (3) granularity need to be determined in consideration of the capacity of the HE-SIG A and the granularity of the TXOP duration. The granularity may be represented as a scaling (or scaling factor) or a TXOP duration unit.

(1) Size of TXOP Duration Field

As to the capacity of the HE-SIG A, 13 remaining bits (e.g., bits that are available since they are not defined for other purposes) in the case of the HE SU PPDU format, 14 remaining bits are present in the case of the HE MU PPDU, and more than 14 remaining bits are present in the case of the HE trigger-based PPDU.

As fields, sizes of which are not currently determined in the HE-SIG A field, for example, BW (2 bits or more), spatial reuse and TXOP duration fields may be exemplified in the HE-MU PPDU format.

As other HE-SIG A fields under discussion, there are a 1-bit reserved field similarly to the legacy system and 1-bit STBC in the case of the HE MU PPDU format.

Accordingly, the length of the TXOP duration field can be limited to a specific size (e.g., 5 to 7 bits) in consideration of other fields of the HE-SIG A.

Furthermore, considering such size restriction, it is desirable that the TXOP duration field have a larger granularity than the MAC duration. That is, the TXOP duration field can have a larger granularity than the MAC duration although it is set to be smaller than the MAC duration.

(2) Maximum Value of TXOP Duration

As described above, the MAC duration field (e.g., 15 bits, unit of 1 μs) can cover up to approximately 32 ms. Although a TXOP limit is approximately 4 ms in a default EDCA parameter set, an AP can set an EDCA parameter set through a beacon.

The AP may set the TXOP duration to be longer than 4 ms by the TXOP duration field (e.g., 8 or 16 ms). Particularly, the AP needs to set a long TXOP duration in an MU TXOP procedure or cascade structure.

In LAA (Licensed Assisted Access) for using unlicensed bands in a cellular system (e.g., 3GPP), a maximum TXOP is defined as 8 ms and Wi-Fi requires a very long TXOP (e.g., up to 10 ms) for sounding packets. According to European LBT (Listen Before Talk) requirements, a maximum channel occupation time can be 10 ms. According to LTE-U that is an LTE system operating in unlicensed bands, a maximum on-state duration is 20 ms.

Considering such design elements, it is desirable that a maximum TXOP duration size that can be indicated by the HE-SIG A field be 8 ms (or 16 ms), for example.

(3) Granularity of TXOP Duration

When one relatively small granularity (e.g., 1 μs, 16 μs or the like) is used, the TXOP duration field requires a lot of bits (e.g., 8 to 15 bits). Table 19 illustrates the number of bits of the TXOP duration and maximum TXOP duration values, which are required when a single granularity is used.

TABLE 19

| | granularity (us) | max TXOP duration (ms) | number of bits |
|---|---|---|---|
| Case 1 | 1 | 32 | 15 |
| Case 2 | | 16 | 14 |
| Case 3 | | 8 | 13 |
| Case 4 | 16 | 32 | 11 |
| Case 5 | | 16 | 10 |
| Case 6 | | 8 | 9 |
| Case 7 | 32 | 32 | 10 |
| Case 8 | | 16 | 9 |
| Case 9 | | 8 | 8 |

Conversely, when only one relatively large granularity is used, an over-protection problem is frequently generated in STAs (e.g., third party STAs) and thus channel use efficiency may decrease (e.g., a NAV is set to an unnecessarily large TXOP duration value).

Figure 23:
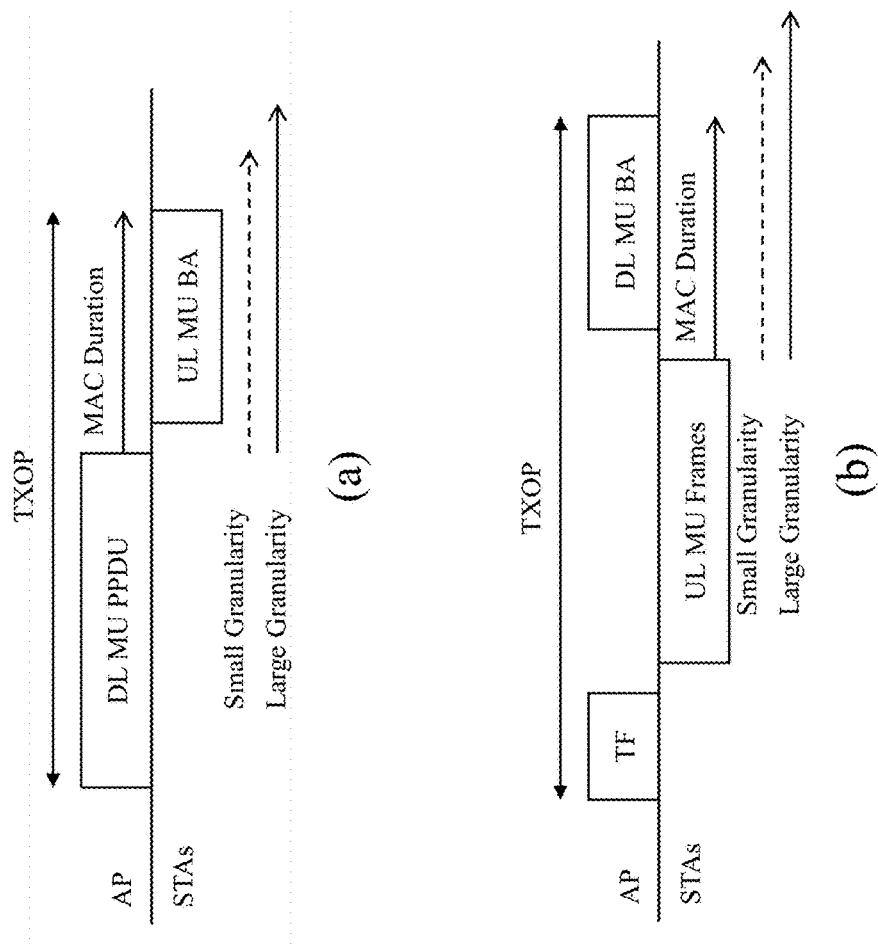
FIG. 23 illustrates TXOP duration setting of multiple granularities according to an embodiment of the present invention.

FIG. 23 illustrates setting of a TXOP duration with a small granularity and setting of a TXOP duration with a large granularity. FIG. 23(a) shows TXOP duration setting for DL transmission and illustrates a case in which STAs transmit UL MU BA in response to a DL MU PPDU transmitted from an AP. FIG. 23(b) shows TXOP duration setting for UL transmission and illustrates a case in which STAs transmit UL MU frames on the basis of a trigger frame transmitted from an AP and the AP transmits DL MU BA. Referring to FIGS. 23(a) and 23(b), the size of an error between a MAC duration and a TXOP duration set by the TXOP duration field of the HE-SIG A is relatively small when the small granularity is used and relatively large when the large granularity is used. In this way, use of a large granularity may cause over-protection beyond actually required TXOP.

Meanwhile, from among relatively small packets (e.g., ACK, BA, MU BA, etc.), ACK or BA is positioned in the last frame of a TXOP. Durations of ACK, BA and/or MU BA depend on their data rates. For example, the duration of UL MU BA is 422.4 μs at a low data rate (e.g., MCS0, 26 tones) (refer to FIG. 24).

Figure 24:
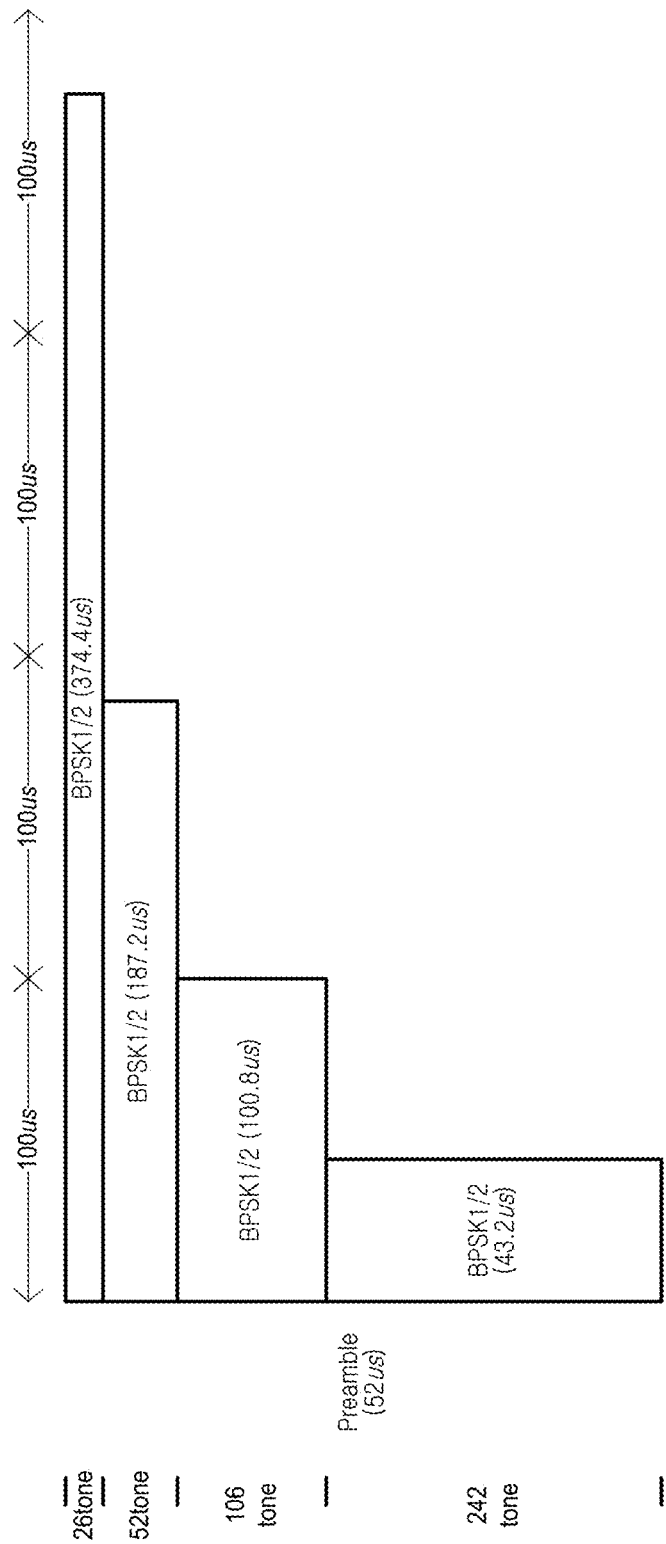
FIG. 24 illustrates allocation of a UL OFDMA BA frame in MCS0 according to an embodiment of the present invention.

FIG. 24 illustrates allocation of a UL OFDMA BA frame in MCS0.

The preamble of the UL OFDMA BA frame has a duration of 48 μs and includes a legacy preamble and an HE preamble. The legacy preamble is 20 μs and may include L-STF (8 μs), L-LTF (8 μs) and L-SIG (4 μs). The HE preamble is 28 μs and may include RL (repetition legacy)-SIG (4 μs), HE-SIG A (8 μs), HE-STF (8 μs) and HE-LTF (8 μs).

The MAC frame of compressed BA may be set to 39 octets, that is, 312 bits. Specifically, the MAC frame of compressed BA corresponds to service field (2 octets)+MPDU delimiter (4 octets)+MAC header (16 octets)+BA control (2 octets)+BA information (10 octets)+FCS (4 octets)+tail (1 octet)=39 octets. The symbol length thereof is 12.8+1.6 CP=14.4 μs. Accordingly, the MAC frame of compressed BA becomes 374.4 μs when MCS0 and 26 tones are used.

Accordingly, when MCS0 and 26 tones are used, the duration of UL MU BA is set to 422.4 μs corresponding to the sum of 48 μs for the preamble and 374.4 μs for the MAC frame.

It may be more efficient to use a small granularity (e.g., less than 32 μs) for at least part of ACK, BA and/or MU BA to solve over-protection by third party STAs.

Accordingly, the TXOP duration needs to support small packets having a small granularity (e.g., 16 or 32 μs). As a method for supporting such small-capacity packets, a method of using multiple granularities (e.g., small and large granularities) for TXOP may be considered.

According to an embodiment of the present invention, multiple units (e.g., multi-granularity) can be used for the TXOP duration. Although the number of multiple units may be 2 (or 4), the number of multiple units is not limited thereto. If the number of units is 2, respective units may be referred to as a small unit and a large unit for convenience. The actual sizes of the small unit and the large unit may depend on the size of the TXOP duration field (e.g., 5, 6 or 7 bits). For example, the small unit can be used to indicate a duration of less than 512 μs and the large unit can be used to indicate a duration in the range of 512 μs to the maximum TXOP duration value (e.g., approximately 8 ms). For example, the small unit can be used for the above-described UL MU BA (e.g., having a duration of approximately 400 μs) of the lowest data rate.

Table 20 illustrates a small unit and a large unit depending on a TXOP duration field size.

TABLE 20

| | TXOP duration Field size (bits) | Max value of TXOP duration (us) | Small unit (us) | Large unit (us) |
|---|---|---|---|---|
| Option 1-1 | 5 | 8192 | 16 | 512 |
| Option 1-2 | | | 32 | |
| Option 2-1 | 6 | 8192 (or 8448) | 16 | 256 |
| Option 2-2 | | 16384 | | 512 |
| Option 3-0 | 7 | 8192 (or 8576) | 8 | 128 |
| Option 3-1 | | 8832 | 4/8/16 | 256 |
| Option 3-2 | | 8704 | 8 | |
| Option 3-3 | | 12616 | 16 | |

(i) Example of Option 1-1 of Table 20: 5-bit Field Size, 2 Units (16 us and 512 us)

Table 21 illustrates TXOP duration values depending on TXOP duration field values (e.g., TXOP indices) in a case in which the TXOP duration field is 5 bits (e.g., B0~B4), small unit=16 μs and large unit=512 μs (option 1-1 of Table 20).

TABLE 21

| B0 | B1~B4 | TXOP duration range | Unit | TXOP duration value |
|---|---|---|---|---|
| 0 | 0000~1111 | 0 us~240 us | 16 us | (16 * value of (B1~B4)) us |
| 1 | 0000~1111 | 512 us~8192 us | 512 us | (512 + 512 * value of (B1~B4)) us |

Referring to Table 21, B0 indicates the unit (or granularity) of a duration. For example, B0=0 indicates a small unit of 16 μs and B0=1 indicates a large unit of 512 μs. Accordingly, an STA can calculate a TXOP duration value on the basis of values of B0 to B4 of the TXOP duration field of the HE-SIG A field. For example, TXOP duration value= (16*value of (B1~B4)) μs when B0=0 and TXOP duration value=(512+512*value of (B1~B4)) μs when B0=1.

(ii) Example of Option 1-2 of Table 20: 5-bit Field Size, 2 Units (32 us and 512 us)

Table 22 illustrates TXOP duration values depending on TXOP duration field values (e.g., TXOP indices) in a case in which the TXOP duration field is 5 bits (e.g., B0~B4), small unit=32 μs and large unit=512 μs (option 1-2 of Table 20).

TABLE 22

| B0 | B1~B4 | TXOP duration range | Unit | TXOP duration value |
|---|---|---|---|---|
| 0 | 0000-1111 | 0 us~480 us | 32 us | (32 * value of (B1~B4)) us |
| 1 | 0000-1111 | 512 us~8192 us | 512 us | (512 + 512 * value of (B1~B4)) us |

Referring to Table 22, B0 indicates the unit (or granularity) of a duration. For example, B0=0 indicates a small unit of 32 μs and B0=1 indicates a large unit of 512 μs. Accordingly, an STA can calculate a TXOP duration value on the basis of values of B0 to B4 of the TXOP duration field of the HE-SIG A field. For example, TXOP duration value= (32*value of (B1~B4)) μs when B0=0 and TXOP duration value=(512+512*value of (B1~B4)) μs when B0=1.

Meanwhile, the STA may acquire a TXOP duration value from a predefined lookup table. For example, the STA may use a lookup table such as Table 23 instead of calculating a TXOP duration value every time. Table 23 shows results calculated according to the above-described TXOP duration value calculation method.

TABLE 23

| TXOP Index | TXOP duration Value (us) |
|---|---|
| 0 | 0 |
| 1 | 32 |
| 2 | 64 |
| 3 | 96 |
| 4 | 128 |
| 5 | 160 |
| 6 | 192 |
| 7 | 224 |
| 8 | 256 |
| 9 | 288 |
| 10 | 320 |
| 11 | 352 |
| 12 | 384 |
| 13 | 416 |
| 14 | 448 |
| 15 | 480 |
| 16 | 512 |
| 17 | 1024 |
| 18 | 1536 |
| 19 | 2048 |
| 20 | 2560 |
| 21 | 3072 |
| 22 | 3584 |
| 23 | 4096 |
| 24 | 4608 |
| 25 | 5120 |
| 26 | 5632 |
| 27 | 6144 |
| 28 | 6656 |
| 29 | 7168 |
| 30 | 7680 |
| 31 | 8192 |

TXOP indices in the left column of Table 23 correspond to B0=0 and TXOP indices in the right column correspond to B0=1. For example, the unit of 32 μs is applied to TXOP indices 0 and 1 and the unit of 512 μs is applied to TXOP indices 16 and 17.

(iii) Example of Option 2-1 of Table 20: 6-bit Field Size, 2 Units (16 us and 256 us)

Table 24 illustrates TXOP duration values depending on TXOP duration field values (e.g., TXOP indices) in a case in which the TXOP duration field is 6 bits (e.g., B0~B5), small unit=16 μs and large unit=256 μs (option 2-1 of Table 20).

TABLE 24

| B0 | B1~B5 | TXOP duration range | Unit | TXOP duration value |
|---|---|---|---|---|
| 0 | 00000-11111 | 0 us~496 us | 16 us | (16 * value of (B1~B5)) us |
| 1 | 00000-11111 | 512 us~8448 us | 256 us | (512 + 256 * value of (B1~B5)) us |

Referring to Table 24, B0 indicates the unit (or granularity) of a duration. For example, B0=0 indicates a small unit of 16 μs and B0=1 indicates a large unit of 256 μs. Accordingly, an STA can calculate a TXOP duration value on the basis of values of B0 to B5 of the TXOP duration field of the HE-SIG A field. For example, TXOP duration value =(16*value of (B1~B5)) μs when B0=0 and TXOP duration value=(512+256*value of (B1~B5)) μs when B0=1.

Meanwhile, the STA may acquire a TXOP duration value from a predefined lookup table. For example, the STA may use a lookup table such as Table 25 instead of calculating a TXOP duration value every time. Table 25 shows results calculated according to the above-described TXOP duration value calculation method.

TABLE 25

| TXOP Index | TXOP duration Value (us) |
|---|---|
| 0 | 0 |
| 1 | 16 |
| 2 | 32 |
| 3 | 48 |
| 4 | 64 |
| 5 | 80 |
| 6 | 96 |
| 7 | 112 |
| 8 | 128 |
| 9 | 144 |
| 10 | 160 |
| 11 | 176 |
| 12 | 192 |
| 13 | 208 |
| 14 | 224 |
| 15 | 240 |
| 16 | 256 |
| 17 | 272 |
| 18 | 288 |
| 19 | 304 |
| 20 | 320 |
| 21 | 336 |
| 22 | 352 |
| 23 | 368 |
| 24 | 384 |
| 25 | 400 |
| 26 | 416 |
| 27 | 432 |
| 28 | 448 |
| 29 | 464 |
| 30 | 480 |
| 31 | 496 |
| 32 | 512 |
| 33 | 768 |
| 34 | 1024 |
| 35 | 1280 |
| 36 | 1536 |
| 37 | 1792 |
| 38 | 2048 |
| 39 | 2304 |
| 40 | 2560 |
| 41 | 2816 |
| 42 | 3072 |
| 43 | 3328 |
| 44 | 3584 |
| 45 | 3840 |
| 46 | 4096 |
| 47 | 4352 |
| 48 | 4608 |
| 49 | 4864 |
| 50 | 5120 |
| 51 | 5376 |
| 52 | 5632 |
| 53 | 5888 |
| 54 | 6144 |
| 55 | 6400 |
| 56 | 6656 |
| 57 | 6912 |
| 58 | 7168 |
| 59 | 7424 |
| 60 | 7680 |
| 61 | 7936 |
| 62 | 8192 |
| 63 | 8448 |

(iv) Example of Option 2-2 of Table 20: 6-bit Field Size, 2 Units (16 us and 512 us)

Table 26 illustrates TXOP duration values depending on TXOP duration field values (e.g., TXOP indices) in a case in which the TXOP duration field is 6 bits (e.g., B0~B5), small unit=16 μs and large unit=512 μs (option 2-2 of Table 20).

TABLE 26

| B0 | B1~B5 | TXOP duration range | Unit | TXOP duration value |
|---|---|---|---|---|
| 0 | 00000-11111 | 0 us~496 us | 16 us | (16 * value of (B1~B5)) us |
| 1 | 00000-11111 | 512 us~16384 us | 512 us | (512 + 512 * value of (B1~B5)) us |

Referring to Table 26, B0 indicates the unit (or granularity) of a duration. For example, B0=0 indicates a small unit of 16 μs and B0=1 indicates a large unit of 512 μs. Accordingly, an STA can calculate a TXOP duration value on the basis of values of B0 to B5 of the TXOP duration field of the HE-SIG A field. For example, TXOP duration value= (16*value of (B1~B5)) μs when B0=0 and TXOP duration value=(512+512*value of (B1~B5)) μs when B0=1.

Meanwhile, the STA may acquire a TXOP duration value from a predefined lookup table. A lookup table corresponding to Table 26 is omitted for convenience.

(v) Example of Option 3-0 of Table 20: 7-bit Field Size, 2 Units (8 us and 128 us)

Table 27 illustrates TXOP duration values depending on TXOP duration field values (e.g., TXOP indices) in a case in which the TXOP duration field is 7 bits (e.g., B0~B6), small unit=8 μs and large unit=128 μs (option 3-0 of Table 20).

TABLE 27

| B0 | B1~B6 | TXOP duration range | Unit | TXOP duration value |
|---|---|---|---|---|
| 0 | 000000-111111 | 0 us~504 us | 8 us | (8 * value of (B1~B6)) us |
| 1 | 000000-111111 | 512 us~8576 us | 128 us | (512 + 128 * value of (B1~B6)) us |

Referring to Table 27, B0 indicates the unit (or granularity) of a duration. For example, B0=0 indicates a small unit of 8 μs and B0=1 indicates a large unit of 128 μs. Accordingly, an STA can calculate a TXOP duration value on the basis of values of B0 to B6 of the TXOP duration field of the HE-SIG A field. For example, TXOP duration value= (8*value of (B1~B6)) μs when B0=0 and TXOP duration value=(512+128*value of (B1~B6)) μs when B0=1.

Meanwhile, the STA may acquire a TXOP duration value from a predefined lookup table. Table 28 is a lookup table corresponding to Table 27.

| TXOP Index | TXOP duration Value (us) |
|---|---|
| 0 | 0 |
| 1 | 8 |
| 2 | 16 |
| 3 | 24 |
| 4 | 32 |
| 5 | 40 |
| 6 | 48 |
| 7 | 55 |
| 8 | 64 |
| 9 | 72 |
| 10 | 80 |
| 11 | 88 |
| 12 | 96 |
| 13 | 104 |
| 14 | 112 |

-continued

| TXOP Index | TXOP duration Value (us) |
|---|---|
| 15 | 120 |
| 16 | 128 |
| 17 | 136 |
| 18 | 144 |
| 19 | 152 |
| 20 | 160 |
| 21 | 168 |
| 22 | 176 |
| 23 | 184 |
| 24 | 192 |
| 25 | 200 |
| 26 | 208 |
| 27 | 216 |
| 28 | 224 |
| 29 | 232 |
| 30 | 240 |
| 31 | 248 |
| 32 | 256 |
| 33 | 264 |
| 34 | 272 |
| 35 | 280 |
| 36 | 288 |
| 37 | 296 |
| 38 | 304 |
| 39 | 312 |
| 40 | 320 |
| 41 | 328 |
| 42 | 336 |
| 43 | 344 |
| 44 | 352 |
| 45 | 360 |
| 46 | 368 |
| 47 | 376 |
| 48 | 384 |
| 49 | 392 |
| 50 | 400 |
| 51 | 408 |
| 52 | 416 |
| 53 | 424 |
| 54 | 432 |
| 55 | 440 |
| 56 | 448 |
| 57 | 456 |
| 58 | 464 |
| 59 | 472 |
| 60 | 480 |
| 61 | 488 |
| 62 | 496 |
| 63 | 504 |
| 64 | 512 |
| 65 | 640 |
| 66 | 768 |
| 67 | 896 |
| 68 | 1024 |
| 69 | 1152 |
| 70 | 1280 |
| 71 | 1408 |
| 72 | 1536 |
| 73 | 1664 |
| 74 | 1792 |
| 75 | 1920 |
| 76 | 2048 |
| 77 | 2176 |
| 78 | 2304 |
| 79 | 2432 |
| 80 | 2560 |
| 81 | 2688 |
| 82 | 2816 |
| 83 | 2944 |
| 84 | 3072 |
| 85 | 3200 |
| 86 | 3328 |
| 87 | 3456 |
| 88 | 3584 |
| 89 | 3712 |
| 90 | 3840 |
| 91 | 3968 |
| 92 | 4096 |
| 93 | 4224 |
| 94 | 4352 |
| 95 | 4480 |
| 96 | 4608 |
| 97 | 4736 |
| 98 | 4864 |
| 99 | 4992 |
| 100 | 5120 |
| 101 | 5248 |
| 102 | 5376 |
| 103 | 5504 |
| 104 | 5532 |
| 105 | 5760 |
| 106 | 5888 |
| 107 | 6016 |
| 108 | 6144 |
| 109 | 6272 |
| 110 | 6400 |
| 111 | 6528 |
| 112 | 6656 |
| 113 | 6784 |
| 114 | 6912 |
| 115 | 7040 |
| 116 | 716 |
| 117 | 7296 |
| 118 | 7424 |
| 119 | 7552 |
| 120 | 7680 |
| 121 | 7808 |
| 122 | 7936 |
| 123 | 8064 |
| 124 | 8192 |
| 125 | 8320 |
| 126 | 8448 |
| 127 | 8576 |

TXOP indices in the left two columns of Table 28 correspond to B0=0 and TXOP indices in the right two columns correspond to B0=1. For example, the unit of 8 μs is applied to TXOP indices 0 and 32 and the unit of 128 μs is applied to TXOP indices 64 and 96.

(vi) Example of Option 3-1 of Table 20: 7-bit Field Size, 4 Units (4 us, 8 us, 16 us and 256 us)

Table 29 illustrates TXOP duration values depending on TXOP duration field values (e.g., TXOP indices) in a case in which the TXOP duration field is 7 bits (e.g., B0~B6) and a total of 4 duration units of 4 μs, 8 μs, 16 μs and 256 μs (option 3-1 of Table 20). For example, 4 μs, 8 μs and 16 μs may correspond to small units and 256 μs may correspond to a large unit.

TABLE 29

| B0B1 | B2~B6 | TXOP duration range | Unit | TXOP duration value |
|---|---|---|---|---|
| 00 | 00000~11111 | 0 us~124 us | 4 us | (4 * value of (B2~B6)) us |
| 01 | 00000~11111 | 128 us~376 us | 8 us | (128 + 8 * value of (B2~B6)) us |
| 10 | 00000~11111 | 384 us~880 us | 16 us | (384 + 16 * value or (B2~B6)) us |
| 11 | 00000~11111 | 896 us~8832 us | 256 us | (896 + 256 * value or (B2~B6)) us |

Referring to FIG. 29, B0B1 indicates one of 4 duration units (or granularities). For example, B0B1=00 indicates 4 μs, B0B1=01 indicates 8 μs, B0B1=10 indicates 16 μs and B0B1=11 indicates 256 μs.

Accordingly, an STA can calculate a TXOP duration value on the basis of values B0 to B6 of the TXOP duration field of the HE-SIG A field. For example, TXOP duration value= (4*value of (B2~B6)) μs when B0B1=00, TXOP duration value=(128+8*value of (B2~B6)) μs when B0B1=01, TXOP duration value=(384+16*value of (B2~B6)) μs when B0B1=10 and TXOP duration value=(896+256*value of (B2~B6)) μs when B0B1=11.

Meanwhile, the STA may acquire a TXOP duration value from a predefined lookup table. A lookup table corresponding to Table 29 is omitted for convenience.

(vii) Example of Option 3-2 of Table 20: 7-bit Field Size, 2 Units (8 us and 256 us)

Table 30 illustrates TXOP duration values depending on TXOP duration field values (e.g., TXOP indices) in a case in which the TXOP duration field is 7 bits (e.g., B0~B6), small unit=8 μs and large unit=256 μs (option 3-2 of Table 20).

TABLE 30

| B0B1 | B2~B6 | TXOP duration range | Unit | TXOP duration value |
|---|---|---|---|---|
| 00 | 00000~11111 | 0 us~248 us | 8 us | (8 * value of (B2~B6)) us |
| 01 | 00000~11111 | 256 us~506 us | | (256 + 8 * value of (B2~B6)) us |
| 10 | 00000~11111 | 512 us~760 us | | (512 + 8 * value or (B2~B6)) us |
| 11 | 00000~11111 | 768 us~8704 us | 256 us | (768 + 256 * value or (B2~B6)) us |

Referring to FIG. 30, B0B1 indicates one of 2 duration units (or granularities). In addition, B0B1 indicates duration values of B2~B3 (00000). For example, B0B1=00 indicates 8 μs and B2~B3(00000)=0. B0B1=01 indicates 8 μs and B2~B3 (00000)=256. B0B1=10 indicates 8 μs and B2~B3 (00000)=512. B0B1=11 indicates 256 μs and B2~B3 (00000)=768 μs.

Accordingly, an STA can calculate a TXOP duration value on the basis of values B0 to B6 of the TXOP duration field of the HE-SIG A field. For example, TXOP duration value= (8*value of (B2~B6)) μs when B0B1=00, TXOP duration value=(256+8*value of (B2~B6)) μs when B0B1=01, TXOP duration value=(512+8*value of (B2~B6)) μs when B0B1=10 and TXOP duration value=(768+256*value of (B2~B6)) μs when B0B1=11.

Meanwhile, the STA may acquire a TXOP duration value from a predefined lookup table. A lookup table corresponding to Table 30 is omitted for convenience.

(viii) Example of Option 3-3 of Table 20: 7-bit Field Size, 2 Units (16 us and 256 us)

Table 31 illustrates TXOP duration values depending on TXOP duration field values (e.g., TXOP indices) in a case in which the TXOP duration field is 7 bits (e.g., B0~B6), small unit=16 μs and large unit=256 μs (option 3-3 of Table 20).

TABLE 31

| B0 | B1~B6 | TXOP duration range | Unit | TXOP duration value |
|---|---|---|---|---|
| 00 | 000000~111111 | 0 us~1008 us | 16 us | (16 * value of (B1~B6)) us |
| 01 | 000000~111111 | 1024 us~12616 us | 256 us | (1024 + 256 * value of (B1~B6)) us |

Referring to Table 31, B0 indicates a duration unit (or granularity). For example, B0=0 indicates a small unit of 16 μs and B0=1 indicates a large unit of 256 μs. Accordingly, an STA can calculate a TXOP duration value on the basis of values B0 to B6 of the TXOP duration field of the HE-SIG A field. For example, TXOP duration value=(16*value of (B1~B6)) μs when B0=0 and TXOP duration value=(1024+ 256*value of (B1~B6)) μs when B0=1.

Meanwhile, the STA may acquire a TXOP duration value from a predefined lookup table. A lookup table corresponding to Table 31 is omitted for convenience.

Table 32 shows throughput and gains with respect to the above-described examples. In Table 32, it is assumed that there are 32 BSSs, a maximum of 64 STAs are present per BSS and reuse factor=4. In addition, 20 MHz channels on 5 GHz and 2Tx-2Rx are assumed. Furthermore, it is assumed that a buffer state is a full buffer state, TXOP is 2 ms and RTS is in an off state. The left column of Table 32 represents a case in which the CF-END frame is not used and the right column of Table 32 represents a case in which the CF-END frame is used.

Referring to Table 32, the influence of most small units (e.g., up to 16 μs) on performance is relatively small. For example, 8/16 μs have throughput loss of 0.7%/1% compared to 1 μs.

When large units are used, use of the CF-END frame to truncate the remaining TXOP is more advantageous to improvement of system throughput and gain.

TABLE 32

| | CF-END off | | CF-END on | |
|---|---|---|---|---|
| unit (μs) | Thpt (Mbps) | Gain | Thpt (Mbps) | Gain |
| 1024 | 247.648 | −49.99% | 464.871 | −6.08% |
| 512 | 331.483 | −33.05% | 466.109 | −5.83% |
| 256 | 394.352 | −20.36% | 465.743 | −5.91% |
| 128 | 439.931 | −11.15% | 464.396 | −6.18% |
| 64 | 466.632 | −5.76% | 465.582 | −5.94% |
| 32 | 481.309 | −2.80% | 479.736 | −3.08% |
| 16 | 489.537 | −1.13% | 488.327 | −1.34% |
| 8 | 491.776 | −0.682% | 491.174 | −0.769% |
| 4 | 493.564 | −0.321% | 493.129 | −0.375% |
| 1 (original) | 495.153 | 0.00% | 494.983 | 0.00% |

(4) Determination of TXOP Duration Value

An STA (e.g., a TXOP holder/responder) transmitting frames needs to determine and calculate a TXOP duration value that the STA intends to signal through the TXOP duration field of the HE-SIG A. For example, the STA can determine a TXOP duration value (e.g., a value indicated by the TXOP duration field of HE-SIG A) on the basis of the duration of a MAC header included in a frame that the STA transmits (e.g., the duration field of the MAC header of MPDU).

Figure 25:
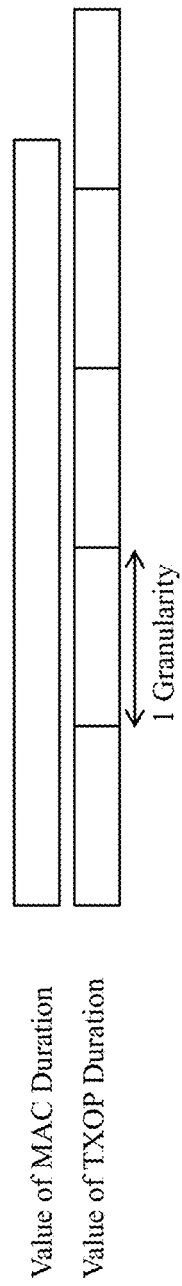
FIG. 25 illustrates a method of setting a TXOP duration value according to an embodiment of the present invention.

FIG. 25 illustrates a method of setting a TXOP duration value according to an embodiment. In the present embodiment, it is assumed that MAC duration value=D.

Referring to FIG. 25, an STA can set TXOP duration value=ceiling (D/granularity)*granularity. Here, ceiling (A) represents the smallest integer from among integers equal to or greater than A. Accordingly, the TXOP duration value is set to be greater than MAC duration value D. For example, TXOP duration value=MAC duration value D is satisfied when the MAC duration value D is a multiple of the granularity and TXOP duration value>MAC duration value D is satisfied in other cases.

For example, when D=100 µs and granularity=16 µs, TXOP duration value=ceiling (100/16)*16=112 µs. When TXOP duration value=1,024 µs is signaled in the same way as option 2-2 of Table 20 (e.g., 6-bit duration, small unit=16 µs and large unit=512 µs), the TXOP duration field value (TXOP index) is set to 7.

In another example, when D=900 µs and granularity=512 µs, TXOP duration value=ceiling (900/512)*512=1,024 µs. When TXOP duration value=1,024 µs is signaled in the same way as option 2-2 of Table 20 (e.g., 6-bit duration, small unit=16 and large unit=512 µs), the TXOP duration field value (TXOP index) is set to 33.

TXOP Termination/Truncation Method

According to the above-described embodiment, the TXOP duration field of HE-SIG A can set a TXOP duration on the basis of a relatively large granularity. For example, the duration field included in the MAC header can be indicated based on a 1 µs granularity, whereas the TXOP duration field of HE-SIG A can be set to indicate a TXOP duration value on the basis of a granularity greater than the granularity of 1 µs.

When the TXOP duration is set by the TXOP duration field of HE-SIG A on the basis of a relatively large granularity, the TXOP duration can be set to a time longer than the time actually used for frame transmission. Accordingly, other STAs may set incorrect NAVs on the basis of HE-SIG A and thus cannot use channels for a specific time, and channel efficiency may be deteriorated.

To solve such problems, information for early termination of TXOP may be transmitted. For example, when a TXOP holder/responder transmits the last frame (e.g., ACK, Block ACK, Multi-STA BA) during a TXOP period, the TXOP holder/responder may include information indicating early termination of TXOP in the last frame and transmit the last frame. Early TXOP termination may be represented as TXOP truncation or simply as (early) termination/truncation. A description will be given of TXOP termination methods.

(1) Method Using CF-END Frame

A TXOP holder/responder can transmit the last frame during a TXOP period and then terminate TXOP by transmitting a CF-END frame.

(2) Method Using Early Termination Indicator

According to an embodiment, an STA can include an early termination indicator in part of a frame (e.g., a common part of HE-SIG A and HE-SIG B, etc.) and transmit the frame. For example, the STA can indicate early TXOP termination by setting early termination indicator=1. TXOP can be terminated immediately after the frame including early termination indicator=1. The early termination indicator may be combined with the duration field when used. For example, early termination indicator=1 can indicate that TXOP is terminated at a time indicated by the duration field. When Duration=0, TXOP can be terminated after the corresponding frame. When the duration field has a value greater than 0, TXOP can be terminated at a time indicated by the duration field.

(i) The MD (more data) field or ESOP field may be reused as the early TXOP termination indicator.

(ii) In the case of a DL frame, the early termination indicator can be transmitted in the last frame of a set TXOP. For example, a TXOP duration is updated and transmitted along with the early termination indicator in the last frame. The TXOP duration is set to be less than a previous TXOP duration and TXOP termination can be indicated through the early termination indicator.

(iii) When TXOP information update is needed, an STA (e.g., a TXOP holder/responder) sets a TXOP updated when a frame is transmitted and transmits the frame. In the frame in which the TXOP is updated, the early termination indicator is used as a TXOP update indicator. For example, the early termination indicator can be set to 1 and transmitted whenever the TXOP is updated. Upon reception of a frame in which the early termination indicator is set to 1, an STA (e.g., a third party STA) updates the TXOP of the corresponding STA (e.g., NAV update).

(iv) In the case of single frame (e.g., PPDU) transmission, the TXOP duration can be set to the size of ACK/BA. In the case of multi-frame transmission, the TXOP duration is set for multi-frame and ACK/BA transmission.

(v) UL MU transmission: If a trigger frame is transmitted in a non-HT PPDU (e.g., 11a format), content of the trigger frame indicates a correct TXOP duration and thus even a legacy STA (e.g., STA that does not support flax) can correctly set the TXOP duration (e.g., NAV setting/update). In a UL MU frame, a TXOP duration corresponding to a transmission duration of an ACK/BA frame is indicated, and thus there is no problem in NAV setting/update.

However, when 11ax format is used and a TXOP duration set in HE-SIG A differs from TXOP duration information included in frame content (TXOP duration of the MAC header), a problem is generated. For example, some STAs (e.g., third party) may read only HE-SIG A and other STAs (e.g., third party) may read both the HE-SIG A and frame content.

STAs that have read both HE-SIG A and frame content set TXOP through duration information of the frame content (e.g., MAC header). For example, the STAs that have read both HE-SIG A and frame content store the duration information included in HE-SIG A. Upon read of the duration of the MAC header (or duration of the content), the STAs determine a final TXOP duration on the basis of the duration of the MAC header (or duration of the content) instead of the duration of HE-SIG A to update NAVs.

STAs that read only HE-SIG A update NAVs on the basis of the TXOP duration included in HE-SIG A. In this case, a problem that a TXOP duration longer than the actual TXOP duration of the MAC header is set may be generated. For example, when an ACK/BA/M-BA frame in response to a UL MU frame is transmitted, the STAs update TXOP through TXOP duration information included in HE-SIG A/B or the MAC header (e.g., NAV update) and can terminate TXOP at a corresponding time when the early termination indicator (or TXOP update indicator) is set to 1.

(vi) TXOP termination may be performed on the basis of a BSS color. For example, an STA (e.g., third party) may be configured to terminate TXOP only when TXOP termination is indicated through a frame corresponding to a BSS color thereof. The STA (e.g., third party) checks a BSS color included in a frame. If the BSS color indicates other BSSs, the STA (e.g., third party) does not terminate TOXP even when the frame indicates TXOP termination. Accordingly, the STA (e.g., third party) can terminate/truncate TXOP only when a frame of the BSS thereof indicates TXOP termination (e.g., explicit indication or implicit indication in which duration is set to 0). However, loss of access opportunity of the STA for other BSSs may occur.

(vi) According to an embodiment, when an STA (e.g., a TXOP holder/responder) transmits 11ax frames within TXOP, the STA can necessarily include TXOP termination/truncation information in the last frame and transmit the last frame. In the case of 11a frames, correct TXOP can be set because TXOP is set through the duration of the MAC header. In an embodiment, the TXOP duration of HE-SIG may be overwritten by the duration of the MAC header.

(3) Method Using Duration Field Value of Last Frame

According to an embodiment, an STA (e.g., a TXOP holder/responder) may indicate early termination/truncation of TXOP by setting the duration field value of the last frame to a specific value (e.g., setting the duration field value to 0 or setting all bits to 1) instead of using an explicit TXOP termination indicator. Accordingly, upon reception of a frame indicating Duration=specific value (e.g., 0), an STA (e.g., third party) can determine that the TXOP duration has been terminated/truncated after the frame. This can be understood as a function similar to the CF-END frame.

(4) NAV Management Method

According to existing NAV setting/update methods, NAV update is performed only when a TXOP duration value of a received frame exceeds a NAV value currently set to an STA (e.g., third party). For early TXOP termination, NAV update needs to be performed even when the TXOP duration value of the received frame is less than the NAV value currently set to an STA. According to an embodiment, the STA may update the NAV with a TXOP duration less than the NAV value currently set thereto on the basis of the aforementioned TXOP truncation/termination/update indicator. However, NAV update with a TXOP duration less than the currently set NAV value may be set to be performed only on the basis of a TXOP termination/update indicator included in myBSS frame.

The STA may set and maintain a NAV per BSS color. When the STA sets a NAV per BSS color, the STA can truncate the TXOP of the NAV corresponding to a BSS color indicated by a frame indicating TXOP truncation upon reception of the frame.

However, to reduce complexity of NAV setting and management, the STA may set and maintain two types of NAVs, i.e., myBSS NAV and other BSS NAV (e.g., BSS other than myBSS or a frame that does not indicate myBSS). The term "myBSS" may be referred to as an intra-BSS NAV.

An operation for TXOP power reduction may be defined. For example, feasibility of NAV update is indicated, an STA (e.g., third party) maintains a wake-up state. If no NAV update is indicated, the STA can switch to a power saving (PS) mode. To this end, an STA (e.g., a TXOP holder/responder) that sets a TXOP may include information about whether NAV update will be performed in a frame and transmit the frame. The STA (e.g., third party) may switch to the PS mode only when a received frame is myBSS frame and indicates switching to the PS mode. (e.g., indicates no NAV update). The STA (e.g., TXOP holder/responder) may not instruct the STA (e.g., third party) to switch to the PS mode when indicating TXOP/NAV update through frame transmission and may instruct the STA (e.g., third party) to switch to the PS mode only when there is no NAV update.

Figure 26:
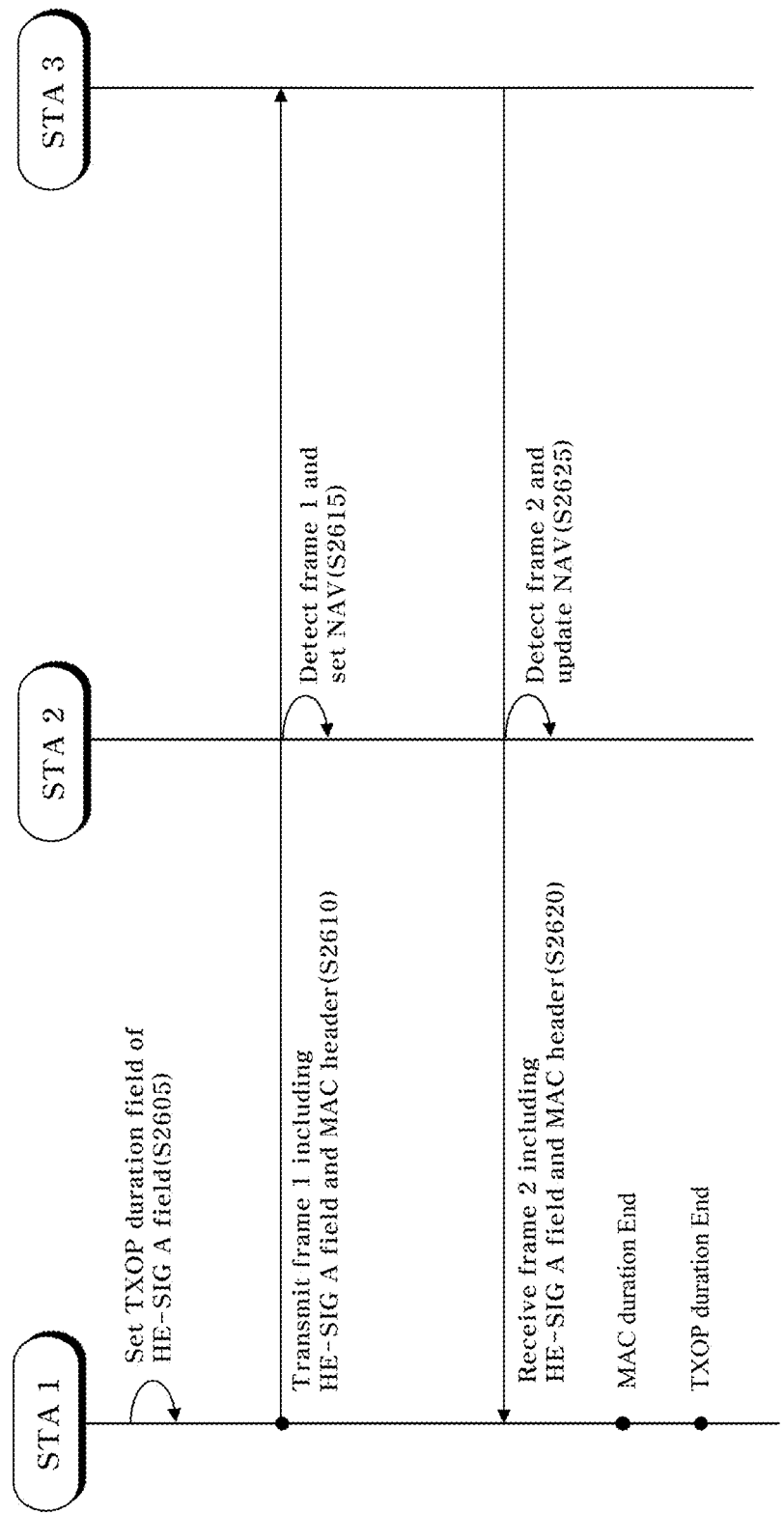
FIG. 26 illustrates a frame transmission and NAV management method according to an embodiment of the present invention.

FIG. 26 illustrates a frame transmission (e.g., TXOP management) and NAV management (e.g., frame reception) method according to an embodiment of the present invention. Description of redundant parts in the above description and the present embodiment will be omitted. It is assumed that STA 1 and STA 3 are TXOP holder/responder STAs and STA 2 is a third party STA. STA 1, STA 2 and STA 3 may be AP or non-AP STAs.

Referring to FIG. 26, STA 1 sets a first duration field (e.g., TXOP duration field) included in an HE-SIG A field. The first duration field may be set to indicate a TXOP (transmission opportunity value) using a smaller number of bits than that of a second duration field (e.g., MAC duration field) included in a MAC header. In addition, a granularity of a time unit used for indicating a TXOP value in the first duration field may be set to differ from a granularity (e.g., 1 μs) of a time unit used in the second duration field of the MAC header. The second duration field may be set to 15 bits.

For example, the granularity used in the first duration field may be set to an integer multiple of the granularity used in the second duration field. Furthermore, the granularity used in the first duration field may vary depending on a TXOP value to be indicated through the first duration field.

The first duration field may include at least one bit (e.g., MSB) indicating a granularity determined according to a TXOP value. The remaining bits of the first duration field may indicate the number of time units included in a TXOP value based on the granularity indicated by the at least one bit.

Specifically, the first duration field may be set to 5, 6 or 7 bits and the MSB (most significant bit) of the first duration field may be used to indicate a granularity. For example, the first duration field can be set to 5 bits and the granularity indicated by the MSB can be one of 32 μs and 512 μs. As another example, the first duration field can be set to 6 bits and the granularity indicated by the MSB can be one of 16 μs and 256 μs. In another example, the first duration field can be set to 7 bits and the granularity indicated by the MSB can be one of 8 μs and 128 μs.

Both the TXOP value indicated by the first duration field and the TXOP value indicated by the second duration field (e.g., MAC duration) may be set for transmission of the same frame. However, the TXOP value indicated by the first duration field can be calculated on the basis of the TXOP value indicated by the second duration field. The TXOP value indicated by the first duration field may be determined to be greater than or equals to the TXOP value indicated by the second duration field.

STA 1 transmits frame 1 including an HE-SIG field and a MAC header (S2601).

It is assumed that STA 3 is designated as a receiver of frame 1 for convenience of description. For example, it is assumed that a receiver address field of frame 1 transmitted by STA 1 is set to the address of STA 3 (e.g., the MAC address or AID of STA 3). Accordingly, STA 1/STA 3 are TXOP holders/responders and STA 2 is a third party STA.

STA 2 receives (or detects) frame 1 transmitted form STA 1 to STA 3 (S2615).

STA 2 may perform NAV management on the basis of one of the first duration field included in the HE-SIG A field and the second duration field included in the MAC header (S2615). NAV management may refer to setting, update or resetting a time period at which channel access is restricted in order to protect the TXOP of the transmitter of frame 1 (e.g., STA 1) or the receiver of frame 1 (e.g., STA 3) when STA 2 is not designated as a receiver of frame 1. It is assumed that STA 2 does not have a currently set NAV value (e.g., NAV=0) for convenience. Accordingly, STA 2 sets a NAV on the basis of frame 1.

An STA performing NAV management can perform NAV management on the basis of the second duration field (e.g., MAC header) upon successful MAC header decoding and perform NAV management on the basis of the first duration field (e.g., HE-SIG A) upon MAC header decoding failure. In the present embodiment, it is assumed that second STA 2 sets a NAV on the basis of the first duration field (e.g., HE-SIG A) for convenience.

Upon reception of frame 1, STA 3 transmits frame 2 including an HE-SIG A and a MAC header to STA 1

(S2620). STA 2 can detect (or receive) frame 2 and update or reset a NAV on the basis of frame 2(S2625).

Figure 27:
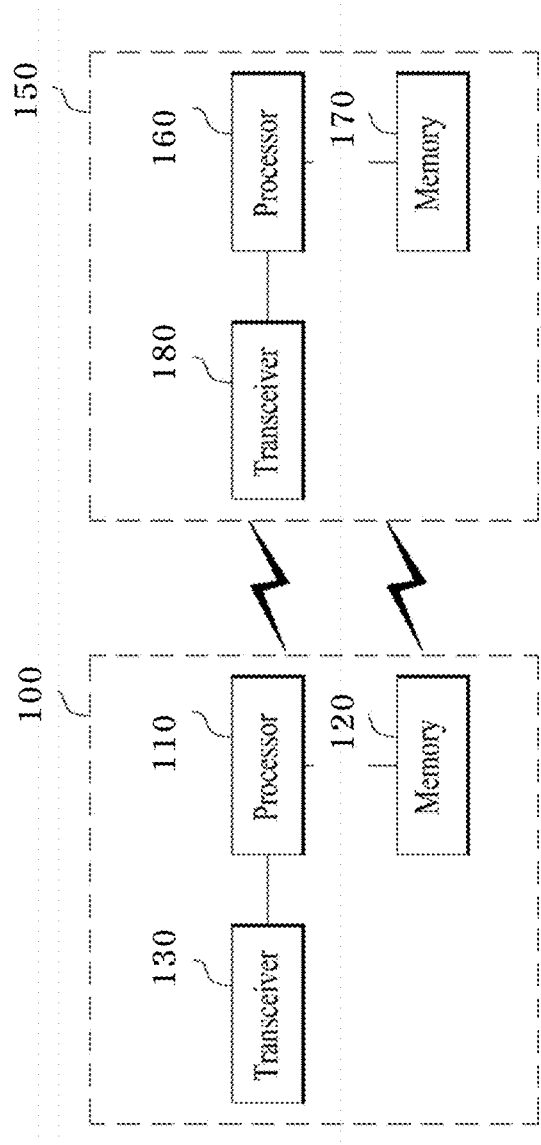
FIG. 27 illustrates an apparatus according to an embodiment of the present invention.

FIG. 27 is an explanatory diagram of apparatuses for implementing the aforementioned method.

A wireless device 800 and a wireless device 850 in FIG. 27 may correspond to the aforementioned STA/AP 1 and STA/AP 2, respectively.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention has been described on the assumption that the present invention is applied to a wireless LAN system supporting HE PPDUs. However, the present invention is not limited thereto and can be applied to various wireless communication systems including IEEE 802.11.

The invention claimed is:

1. A method of transmitting a frame by a station (STA) in a wireless LAN system supporting a high efficiency physical layer protocol data unit (HE PPDU), comprising:
setting a first duration field included in an HE-SIG A field; and
transmitting a frame including the HE-SIG A field and a MAC header,
wherein in setting of the first duration field included in the HE-SIG A field, the first duration field is set to indicate a transmission opportunity (TXOP) value using a smaller number of bits than a second duration field included in the MAC header, and
wherein a granularity of a time unit used for indicating the TXOP value in the first duration field is set to be different from a granularity of a time unit used in the second duration field.

2. The method according to claim 1, wherein the granularity of the time unit used in the first duration field varies depending on the TXOP value to be indicated through the first duration field.

3. The method according to claim 1, wherein the first duration field includes at least one bit indicating the granularity that is determined according to the TXOP value.

4. The method according to claim 3, wherein remaining bits of the first duration field indicate how many number of time units based on the indicated granularity are included in the TXOP value.

5. The method according to claim 1, wherein the first duration field is set to 5, 6 or 7 bits and a most significant bit (MSB) of the first duration field is used to indicate the granularity of the time unit.

6. The method according to claim 5,
wherein the first duration field is set to 5 bits and the granularity indicated by the MSB is one of 32 µs and 512 µs, or
wherein the first duration field is set to 6 bits and the granularity indicated by the MSB is one of 16 µs and 256 µs, or
wherein the first duration field is set to 7 bits and the granularity indicated by the MSB is one of 8µs and 128 µs.

7. The method according to claim 1, wherein both the TXOP value indicated by the first duration field and a TXOP value indicated by the second duration field are set for transmission of a same frame, and
wherein the TXOP value indicated by the first duration field is greater than or equals to the TXOP value indicated by the second duration field.

8. A station (STA) transmitting a frame in a wireless LAN system supporting a high efficiency physical layer protocol data unit (HE PPDU), comprising:
a processor for setting a first duration field included in an HE-SIG A field; and
a transmitter for transmitting a frame including the HE-SIG A field and a MAC header,
wherein in setting of the first duration field included in the HE-SIG A field, the first duration field is set to indicate a transmission opportunity (TXOP) value using a smaller number of bits than a second duration field included in the MAC header, and
wherein a granularity of a time unit used for indicating the TXOP value in the first duration field is set to be different from a granularity of a time unit used in the second duration field.

9. A method of managing a network allocation vector (NAV) by a station (STA) in a wireless LAN system supporting a high efficiency physical layer protocol data unit (HE PPDU), comprising:
receiving a frame including an HE-SIG A field and a MAC header; and
performing NAV management based on one of a first duration field included in the HE-SIG A field and a second duration field included in the MAC header,
wherein the first duration field is set to indicate a transmission opportunity (TXOP) value using a smaller number of bits than the second duration field included in the MAC header, and wherein a granularity of a time unit used for indicating the TXOP value in the first duration field is set to be different from a granularity of a time unit used in the second duration field.

10. The method according to claim 9, wherein the performing of NAV management comprises setting, updating or resetting a time where channel access is restricted in order to protect a TXOP of a transmitter of the frame or a receiver of the frame when the STA is not designated as the receiver of the frame.

11. The method according to claim 9, wherein the performing of NAV management comprises:
performing NAV management based on the second duration field when the MAC header has been successfully decoded and
performing NAV management based on the first duration field when decoding of the MAC header has been failed.

12. The method according to claim 9, wherein the granularity used in the first duration field varies depending on the TXOP value to be indicated through the first duration field.

13. The method according to claim 9, wherein the first duration field includes at least one bit indicating the granularity that is determined according to the TXOP value and remaining bits of the first duration field indicate how many number of time units based on the indicated granularity are included in the TXOP value.

14. The method according to claim 9,
wherein the first duration field is set to 5 bits and a most significant bit (MSB) of the first duration field indicates one of granularities 32 µs and 512 µs, or
wherein the first duration field is set to 6 bits and the MSB of the first duration field indicates one of granularities 16 µs and 256 µs, or
wherein the first duration field is set to 7 bits and the MSB of the first duration field indicates one of granularities 8 µs and 128 µs.

15. The method according to claim 9, wherein both the TXOP value indicated by the first duration field and a TXOP value indicated by the second duration field are set for transmission of a same frame, and
wherein the TXOP value indicated by the first duration field is greater than or equals to the TXOP value indicated by the second duration field.

* * * * *